United States Patent [19]

Katoh et al.

[11] Patent Number: 5,271,358
[45] Date of Patent: Dec. 21, 1993

[54] FUEL INJECTION SYSTEM FOR ENGINE

[75] Inventors: Masahiko Katoh; Masanori Takahashi, both of Hamamatsu, Japan

[73] Assignee: Sanshin Kogyo Kabushiki Kaisha, Hamamatsu, Japan

[21] Appl. No.: 853,496

[22] Filed: Mar. 18, 1992

Related U.S. Application Data

[63] Continuation-in-part of Ser. No. 831,786, Feb. 5, 1992.

[30] Foreign Application Priority Data

Mar. 20, 1991 [JP] Japan .................. 3-080552

[51] Int. Cl.$^5$ .................. F02M 31/00; F01L 11/00
[52] U.S. Cl. .................. 123/73 PP; 123/549; 123/533
[58] Field of Search .............. 123/93 PP, 73 C, 65 P, 123/549, 533, 552, 543, 546, 547, 305

[56] References Cited

U.S. PATENT DOCUMENTS

| | | | |
|---|---|---|---|
| 3,881,454 | 5/1975 | Jaulmes | 123/65 P |
| 4,325,341 | 4/1982 | Yamauchi et al. | 123/549 |
| 4,790,270 | 12/1988 | McKay et al. | 123/305 |
| 4,984,540 | 1/1991 | Morikawa | 123/73 C |
| 5,060,602 | 10/1991 | Maissant | 123/73 PP |
| 5,086,747 | 2/1992 | Curhan | 123/549 |
| 5,119,794 | 6/1992 | Kushida et al. | 123/549 |

FOREIGN PATENT DOCUMENTS 62-87634 4/1987 Japan .
62-253920 11/1987 Japan .

Primary Examiner—Tony M. Argenbright
Assistant Examiner—M. Macy
Attorney, Agent, or Firm—Ernest A. Beutler

[57] ABSTRACT

A fuel injection system for engines that employs a fuel injector that sprays into a chamber to which compressed air is delivered and which chamber communicates with the combustion chamber through a port that is opened and closed by the reciprocation of the piston in a reciprocating engine. The source of compressed air may either be an air compressor or a crankcase chamber of the engine and the air compressor and/or crankcase chamber may also provide scavenging air for the engine. A variety of port arrangements are disclosed which include either single ports or a plurality of ports either circumferentially or axially spaced from each other and disposed between either the scavenge ports and exhaust ports or around a scavenge port or an exhaust port. Various arrangements are disclosed for improving the vaporization of the fuel in the chamber in which it is injected. Also, a control routine is described whereby it is insured that all of the fuel will be discharged from the chamber into which it is injected during each cycle of opening and closing of the injection port so as to improve fuel economy and reduce hydrocarbon emissions.

45 Claims, 29 Drawing Sheets

FUEL INJECTION SYSTEM FOR ENGINE

CROSS REFERENCE TO RELATED APPLICATION

This application is a continuation-in-part of our application entitled "Fuel Injection System For Two Cycle Engine", Ser. No. 831,786, filed Feb. 5, 1992, and assigned to the Assignee hereof.

BACKGROUND OF THE INVENTION

This invention relates to a fuel injection system for an engine and more particularly to an improved type of fuel injection system that is particularly adapted for use in a two cycle or ported engine.

As noted in the co-pending application aforenoted, fuel injection systems for internal combustion engines have generally fallen into two types. These two types are the direct cylinder injected type or the manifold type. In addition, some fuel injectors in addition to injecting fuel also inject a gas under pressure such as air. The previously proposed injection systems of these general types have had a number of disadvantages which are detailed in the aforenoted co-pending application. As is disclosed in that application, there are a number of embodiments which enjoy the advantages of direct cylinder fuel injection without having the disadvantages of such direct cylinder injectors. In addition, the systems disclosed in that application permit the injection of fuel and air under pressure without having the disadvantages of the prior art type of fuel/air injection systems.

It is a principal object to this invention to provide further advantages in fuel injection systems of the type as described in the aforenoted co-pending application.

In the co-pending application, a chamber is formed that communicates with the combustion chamber under some phases of the engine operation through a nozzle port formed in the cylinder itself. Fuel is sprayed into this chamber and is delivered to the combustion chamber through the nozzle port under the influence of a high pressure air flow. Although that construction and those embodiments shown in the earlier application have a number of advantages, still further advantages can be enjoyed.

Specifically, it is desirable to insure that all of the fuel sprayed into the chamber is discharged during each cycle when the injection port is opened. Any fuel that may remain in the chamber after the injection port is closed will enter the combustion chamber on the next opening of the injection port and this fuel can be swept out of the exhaust port causing poor fuel economy and also high hydrocarbon emissions.

It is, therefore, a principal object to this invention to provide an fuel injection system of that general type wherein it is insured that all of the fuel will be discharged from the chamber into which it is injected each time the nozzle port is opened and closed so that no residual fuel will remain in the chamber from cycle to cycle.

When fuel is injected into a small chamber for later injection into the combustion chamber through an injection port, there is a danger of fuel condensation in the chamber or in the nozzle port or the area around the nozzle port when it is opened.

It is, therefore, a still further object to this invention to provide an improved arrangement for insuring a good vaporization of the fuel that is delivered from the chamber through the injection port.

SUMMARY OF THE INVENTION

A first feature of this invention is adapted to be embodied in a fuel injection system for an internal combustion engine that comprises means defines a chamber which is adapted to communicate with the engine through an injection port. Means are provided for sequentially opening and closing the injection port and means deliver a pressurized gas to the chamber. A fuel injector is provided for spraying fuel into the chamber at a place spaced from the injection port. Means initiate the beginning and ending of the injection of fuel from the fuel injector so that all fuel injected into the chamber during each cycle when the injection port is opened will be discharged from the injection port before the injection port is closed.

Another feature of the invention is adapted to be embodied in a fuel injection system for an internal combustion engine that is comprised of means defining a chamber adapted to communicate with the engine through an injection port. Means are provided for delivering a pressurized gas to the chamber. A perforate member is disposed in the chamber in a position so that the pressurized gas must flow at least in part across the perforate member to exit the injection port. A fuel injector sprays fuel into the chamber and at least in part on to the perforate member.

Another feature of the invention is adapted to be embodied in an internal combustion engine having means defining a chamber that is adapted to communicate with the engine through an injection port. Means deliver a pressurized gas to the chamber. A fuel injector is provided for spraying fuel into the chamber. In accordance with this feature of the invention, means are provided for heating the chamber to assist in the vaporization of the fuel.

A further feature of the invention is adapted to be embodied in a method of operating a fuel injection system for an internal combustion engine that defines a chamber that is adapted to communicate with the engine through an injection port which is sequentially opened and closed. Means deliver a pressurized gas to the chamber and a fuel injector sprays fuel into the chamber at a place spaced from the injection port. In accordance with the method, the beginning and ending of the injection of fuel by the fuel injector is timed relative to the opening and closing of the injection port so that all fuel injected into the chamber during each cycle when the injection port is opened will be discharged from the injection port before the injection port is closed.

DETAILED DESCRIPTION OF THE PREFERRED EMBODIMENTS OF THE INVENTION

Figure 1:
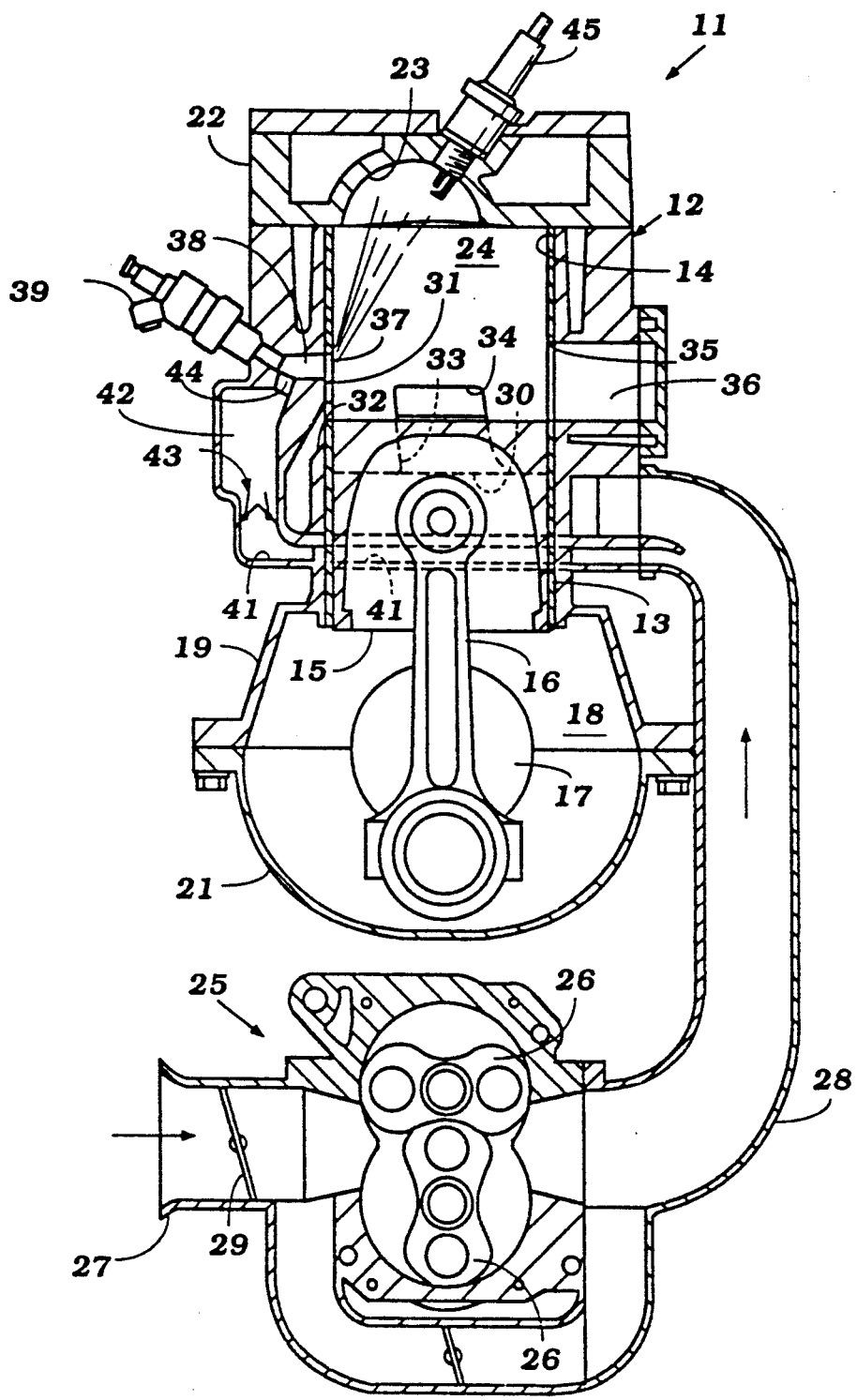
FIG. 1 is a partially schematic cross sectional view taken through a single cylinder of an engine having a fuel injection system constructed in accordance with a first embodiment of the invention.

Referring now in detail to the drawings and initially to the embodiment of FIG. 1, a multiple cylinder internal combustion engine constructed in accordance with this embodiment is identified generally by the reference numeral 11. Although the engine 11 is a multiple cylinder engine, only a single cylinder thereof is shown in cross section. It is believed that those skilled in the art will readily understand how the invention may be practiced with multiple cylinder engines, or in fact, engines having multiple combustion chambers and other than reciprocating engines. The engine 11 also operates on a two stroke principal but it will be understood that certain facets of the invention may also be employed in conjunction with four stroke engines. However, the invention does have particular utility in connection with two stroke engines.

The engine 11 is comprised of a cylinder block, indicated generally by the reference numeral 12 and in which a pressed or cast-in cylinder 13 is contained which defines a cylinder bore 14. A piston 15 is supported for reciprocation within the cylinder bore 14 and is connected by means of a connecting rod 16 to a throw of a crankshaft 17. The crankshaft 17 is rotatably journaled within a crankcase chamber 18 formed by a skirt 19 of the cylinder block 12 and a crankcase member 21 that is affixed to the skirt 19 in a known manner.

A cylinder head 22 is affixed to the cylinder block 12 in a known manner and has a recess 23 which cooperates with an area formed above the head of the piston 15 and the cylinder bore 18 to define a variable volume chamber 24. As the piston 15 reciprocates relative to the cylinder block and cylinder head 22, the volume of the chamber 24 will vary. The chamber 24 and recess 23 will, at times, be referred to as the combustion chamber.

A scavenge pump, indicated generally by the reference numeral 25 is provided for delivering a compressed air charge to the combustion chamber 24 and also for vaporizing a fuel injection spray, as will become apparent. In the illustrated embodiment, the scavenge pump 25 is of the positive displacement rotes having a pair of intermeshing rotors 26 that are driven by the engine crankshaft 17 in a known manner. The scavenge pump 25 draws atmospheric air through an inlet 27 and air filter and silencer (not shown) and discharges it through a scavenge pressure conduit 28. A manually operated throttle valve 29 is positioned in the inlet passage 27 for throttling the intake air and controlling the speed of the engine 11.

The scavenge pressure conduit 28 communicates with a scavenge manifold 30 that is formed integrally with the cylinder block 12 or which may be a separate component and which encircles the cylinder liner 13. The scavenge manifold 30 communicates with a first scavenge port 31 through a scavenge passageway 32. A pair of side scavenge passageways 33 are disposed on opposite sides of the center scavenge passageway 32 and communicate the scavenge manifold 30 with the cylinder bore 14 through scavenge ports 34.

An exhaust port 35 is formed in the cylinder liner 13 diametrically opposite to the scavenge port 31 and communicates with an exhaust passage 36 formed in the cylinder block 12 which communicates with a suitable exhaust system (not shown) for discharge of the exhaust gases to the atmosphere.

The porting arrangement described provides a so-called Schnurle scavenging for the combustion chamber 24 and causes the inlet charge to be directed generally upwardly toward the cylinder head recess 23 so as to provide good scavenging of the combustion chamber 24.

An injection port 37 which is comprised of a single or group of small orifices in formed in the cylinder liner 13 at a point above the center scavenge port 31 and are directed generally upwardly toward the combustion chamber recess 23. The injection port 37 is disposed at approximately the same height as the exhaust port 35 so that it will open substantially simultaneously with the opening of the exhaust port 35. A chamber 38 is formed in the cylinder block 12 and communicates with the injection port 37. A fuel injector 39 of any known type is disposed so as to spray into the cylinder block chamber 35.

A source of compressed, high pressure air is also supplied to the chamber 38, in this embodiment from the scavenge pump 25. To this end, there is provided a further pressure manifold 41 which encircles the cylinder block 12 and may be formed integrally with it below the scavenge manifold 30. The pressure manifold 41 communicates with an accumulator chamber 42 formed in the cylinder block 12 through a reed type check valve 43. The pressure accumulator chamber 42 communicates with the injection chamber 38 through a somewhat restricted passageway 44.

A spark plug 45 is mounted in the cylinder head 22 with its gap extending into the recess 23 at a position so as to be intersected by the spray of fuel from the injector port 37 so as to permit fuel stratification at low and mid range performance and also so as to insure that a stoichiometric mixture will be present at the gap of the spark plug 45 at the time it is fired. The spark plug 45 is fired by a suitable ignition system.

The engine 11 operates in a manner now to be described. When the previously injected charge has been fired by the spark plug 45, the piston 15 will be driven downwardly driving the crankshaft 17. As the piston 15 moves downwardly, the exhaust port 35 will be opened and, at approximately the same time, the injection port 37 will be opened. When the injection port 37 is opened, a high pressure air charge from the scavenge pump 25 will be admitted in a generally upwardly direction toward the cylinder head recess 23 to assist in exhaust gas purging. At this time, no fuel is injected by the injector 39.

As the piston 15 continues to move downwardly, eventually the scavenge ports 31 and 34 will be opened and the scavenging will be continued to be completed. In addition, the combustion chamber 24 will then become charged with a high pressure air charge. As the piston 15 moves upwardly, the injector 39 will be operated so as to inject fuel into the chamber 38. The timing and duration of this injection will depend upon the load on the engine.

When the fuel injector 39 discharges, the air pressure from the scavenge pump 25 will atomize the fuel and direct it upwardly toward the gap of the spark plug 45. This operates continues until the injection port 37 is closed although fuel injection may be terminated from the injector 39 at some time prior to the closing of the injection port 37.

The charge is continued to be compressed and then will be fired by the spark plug 45 at the appropriate timing interval. Therefore, it should be readily apparent that the fuel injector 39 due to the injection into the chamber 38 will act like an air/fuel injector but will not have the complicated construction of prior art type of air/fuel injectors. Also, stratification is possible without direct cylinder injection and hence the injector need not be designed so as to be able to withstand the high pressure and temperature in the combustion chamber 24.

Figure 2:
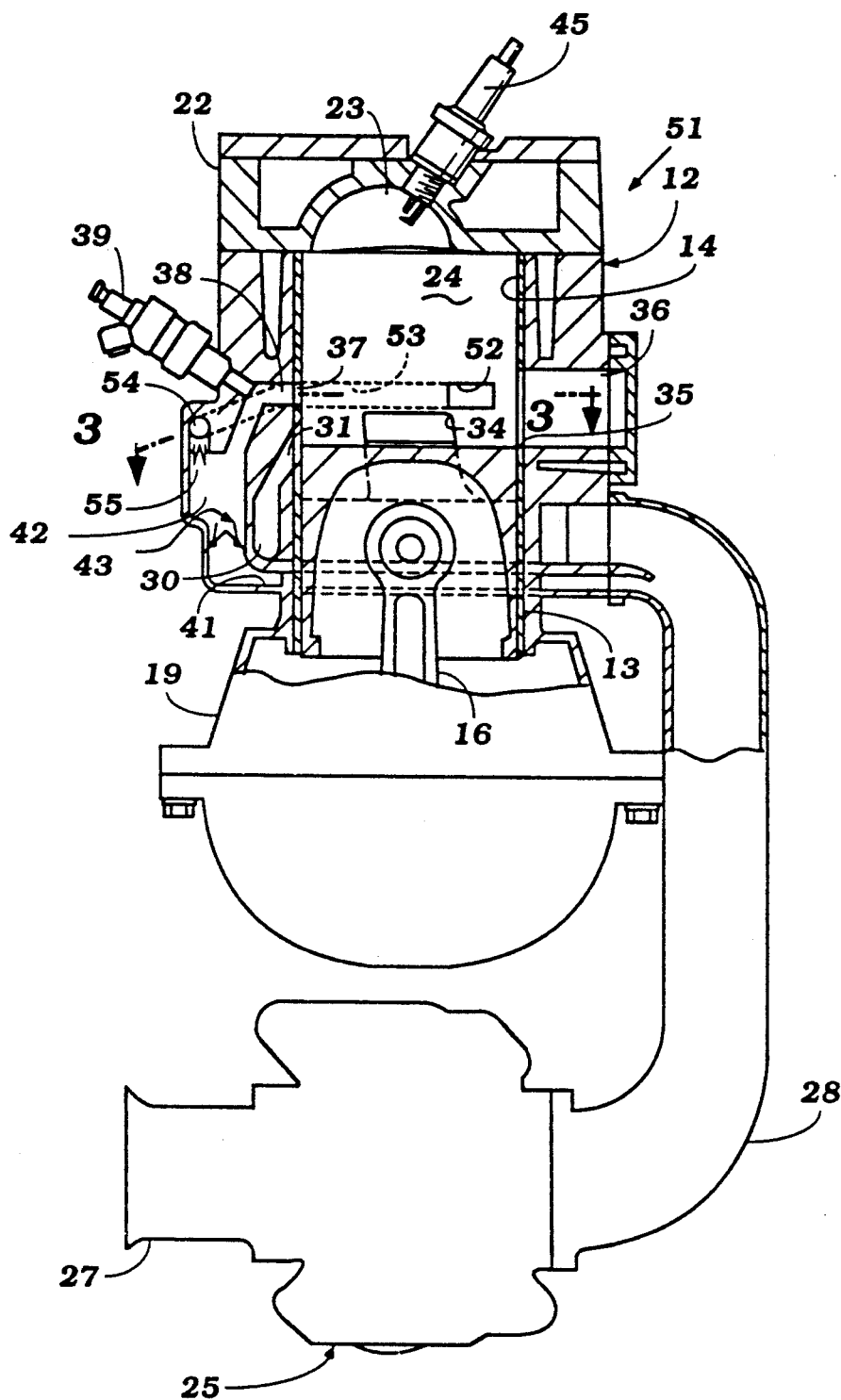
FIG. 2 is a partial cross sectional, in part similar to FIG. 1, and shows a second embodiment of the invention.
Figure 3:
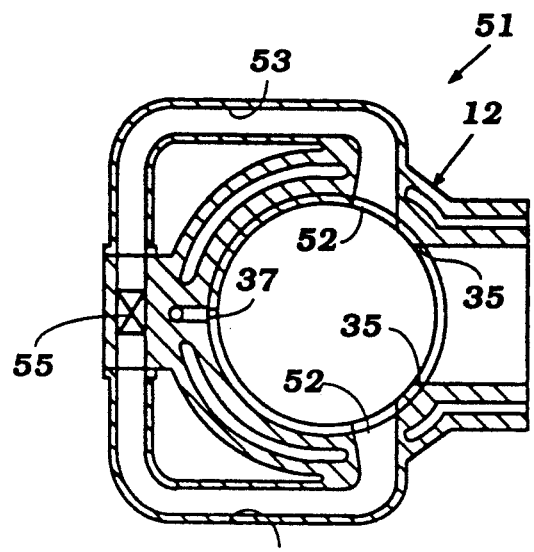
FIG. 3 is a cross sectional view taken along the line 3—3 of FIG. 2.

FIGS. 2 and 3 shows another embodiment of the invention wherein the engine of this embodiment is identified generally by the reference numeral 51. In this embodiment, the engine 51 is generally of the same construction as the engine 11 of the embodiment of FIG. 1 and, therefore, components which are same or substantially the same have been identified by the same reference numerals. In this embodiment, however, rather than using a pure air charge to assist in vaporizing fuel sprayed by the fuel injector 38, the exhaust gases are employed for this purpose. This embodiment, in addition to having the injection chamber 38 communicate with the scavenge air pressure accumulator chamber 42, there is provided a pair of exhaust boost ports 52 that are positioned on diametrically adjacent sides to the main exhaust port 35. The exhaust boost ports 52 communicate with an exhaust boost manifold 53 which is formed integrally with the cylinder block 12 and which communicates with a chamber 54 that communicates also with the chamber 38. A reed type check valve 55 is provided so as to permit air pressure to flow into the manifold 53 but to preclude exhaust gases from flowing into the accumulator chamber 42. In this way, the exhaust gases also may be employed as a source of pressure for vaporizing the fuel sprayed from the injection nozzle port 37. In all other regards, this embodiment operates like the previously described embodiment.

In the embodiments of the invention as thus far described, the size and number of the nozzle ports 37, which are formed directly in the cylinder liner 13, can be chosen so as to provide the desired fuel spray and fuel amount. However, this necessitates accurate forming in the cylinder liner. An engine constructed in accordance with another embodiment is shown partially in FIG. 4 and is identified generally by the reference numeral 101. This engine has the construction of the embodiment of FIG. 1, it will be readily apparent to those skilled in the art how the invention can be employed with a construction as shown in FIG. 3. In this embodiment, a nozzle port 102 is formed in the cylinder liner 13 which has a generally larger opening than the previously described embodiment. However, a flow restricting orifice 103 similar to a metering jet is positioned in the cylinder block upstream of the chamber 38 and communicating the chamber 38 with the cylinder liner nozzle port 102 for controlling the amount of flow through this port. In this way, the flow variations can be easily changed by changing the insert orifice 103.

Figure 5:
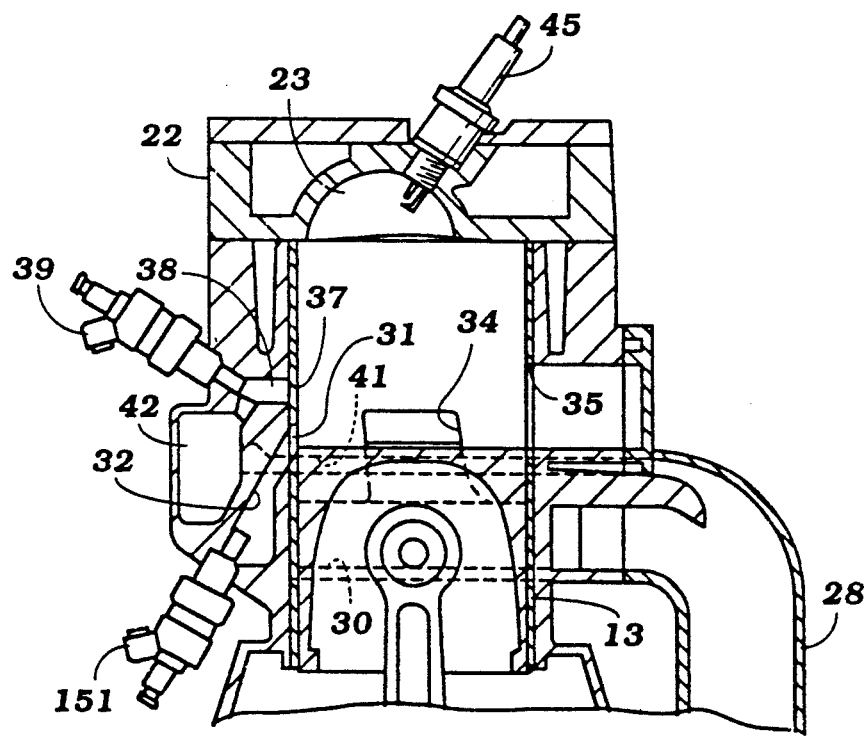
FIG. 5 is a partial cross sectional view, in part similar to FIGS. 1, 2 and 4, and shows a fourth embodiment of the invention.

In the embodiments of the invention as thus far described, all of the fuel for engine operation have been supplied by the injector 39. However, it is also possible to provide an arrangement wherein at least part of the fuel supply for the engine under some running conditions is supplied by an auxiliary or supplemental fuel injector. FIG. 5 shows such an embodiment wherein there is provided a supplemental fuel injector 151. In this embodiment, the auxiliary fuel injector 151 discharges into the scavenge manifold 41 and specifically to the scavenge port 32 so that the fuel will be directed generally toward the cylinder head recess 23. Any type of desired control strategy may be employed but primarily the fuel injector 151 is utilized so as to provide additional fuel for maximum speed and load conditions. Of course, the supplemental fuel injector 151 could be positioned anywhere else in the engine and/or its induction system so as to spray fuel directly into the combustion chamber or into the induction system.

All of the embodiments of the invention as thus far described, the scavenge air has been provided by a separate scavenge pump 25 which in the illustrated embodiments has been a positive displacement type of pump. It should be readily apparent, however, that other forms of scavenge compressors may be employed and, in fact, the invention may also be utilized, in some instances, in conjunction with arrangements wherein the crankcase chambers 18 are themselves used as the pumping device. This is not the case in the embodiments thus far described and, for that reason, the crankcase chambers 18 of the previously described embodiments may be provided with a suitable atmospheric vent so that the change in volume of the chambers 18 during the reciprocation of the piston 15 will not cause any significant pumping losses. In addition, the crankcase chambers 18 of the previously described embodiments may be partially filled with lubricant so that the engines of these embodiments and specifically the crankshaft 17 and journals of the connecting rod 16 can be lubricated in a system similar to four cycle engines. Preferably, some form of splash lubrication system is employed.

Figure 6:
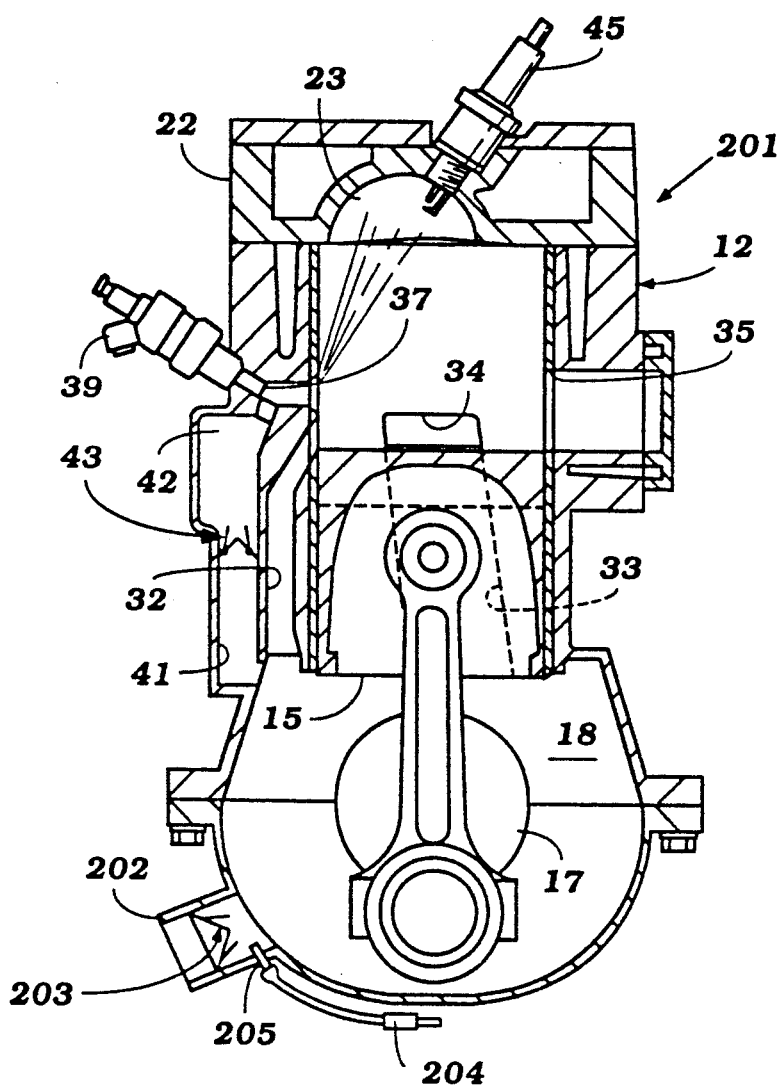
FIG. 6 is a cross sectional view, in part similar to FIGS. 1, 2, 4 and 5, and shows a fifth embodiment of the invention.

FIG. 6 shows an embodiment wherein the actual pressure differences in the crankcase chamber 18 are employed for pressurizing the injection chamber 38 and also for supplying the scavenge ports 31 and 34. However, the basic construction of the engine, indicated generally by the reference numeral 201 in this embodiment, is the same as the embodiment of FIG. 1. For that reason, components which are the same have been identified by the same reference numerals and will be described again only insofar as is necessary to understand the construction and operation of this embodiment.

In this embodiment, the scavenge manifold 29 is eliminated and the scavenge passages 32 and 33 communicated directly with the crankcase chamber 18 of the respective cylinder. In addition, the injection manifold 41 communicates also with the crankcase chambers 18.

An atmospheric air port 202 is provided that communicates the crankshaft chamber 18 with the atmosphere through an air cleaner/air silencer arrangement (not shown) and a reed type check valve 203 is positioned in this passage, as is typical with two cycle, crankcase, compression engines. The charge drawn into the crankcase chambers 18 is then compressed and delivered both to the scavenge passages 32 and 33 and injection passage 41 so as to provide the effects previously noted.

This engine 201 may also be provided with a lubricating system including a lubricant pump 204 that delivers lubricant under pressure to the atmospheric inlet 202 downstream or upstream of the check valve 203 through a lubricant injector nozzle 205.

Figure 7:
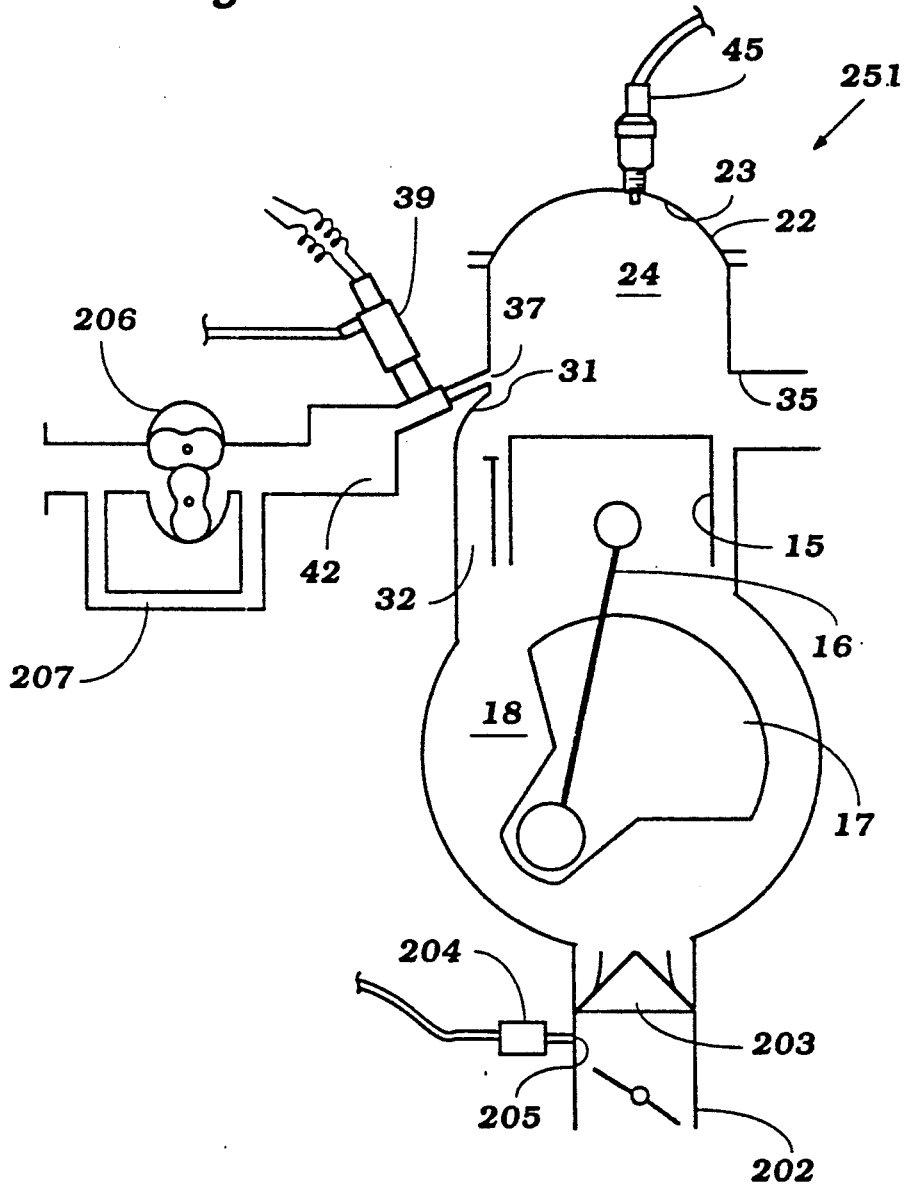
FIG. 7 is a partially schematic cross sectional view of a sixth embodiment of the invention.

FIG. 7 shows another embodiment of the invention which is generally similar to the embodiment of FIG. 1 but wherein the engine constructed in accordance with this embodiment is identified generally by the reference numeral 251. Again, where the engine 251 has a construction the same as or similar to the previously described embodiments, components of it have been identified by the same reference numerals as applied to previous components.

It should be noted that the engine 251 has its scavenging system constructed in a conventional scavenging system for a two cycle, crankcase, compression engine and, therefore, the atmospheric air inlet 202, reed type check valve 203, and lubrication system of the embodiment of FIG. 6 have been illustrated and identified by the same reference numerals.

In this embodiment, an injection air compression pump 206 which can be of a smaller capacity than the scavenge pumps 205 of the previous embodiments, is provided for supplying air only to the accumulator chamber 42 associated with the fuel injection system. A by-pass passageway 207 is incorporated between the inlet and outlet sides of the scavenge pump 206 so as to relieve pressure when the injector port 237 is closed. Hence, this embodiment achieves all of the advantages of embodiments of FIGS. 1 through 5 but does not necessitate the use of as large a pump. However, the pressure scavenging of this embodiment will not be as effective as the embodiments using a larger scavenge pump.

Figure 8:
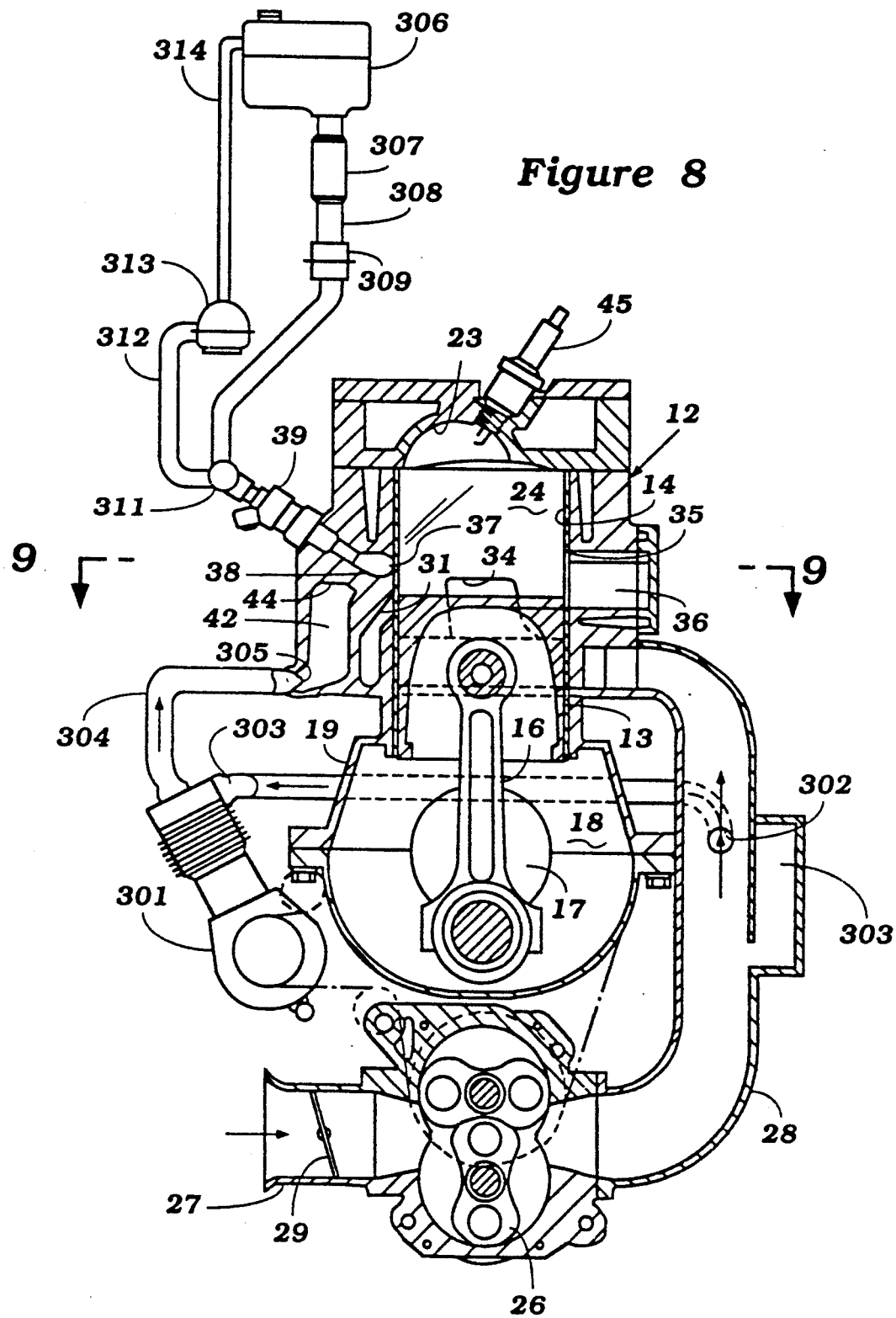
FIG. 8 is a cross sectional view, in part similar to FIGS. 1, 2, 4, 5 and 6 and shows a seventh embodiment of the invention.
Figure 9:
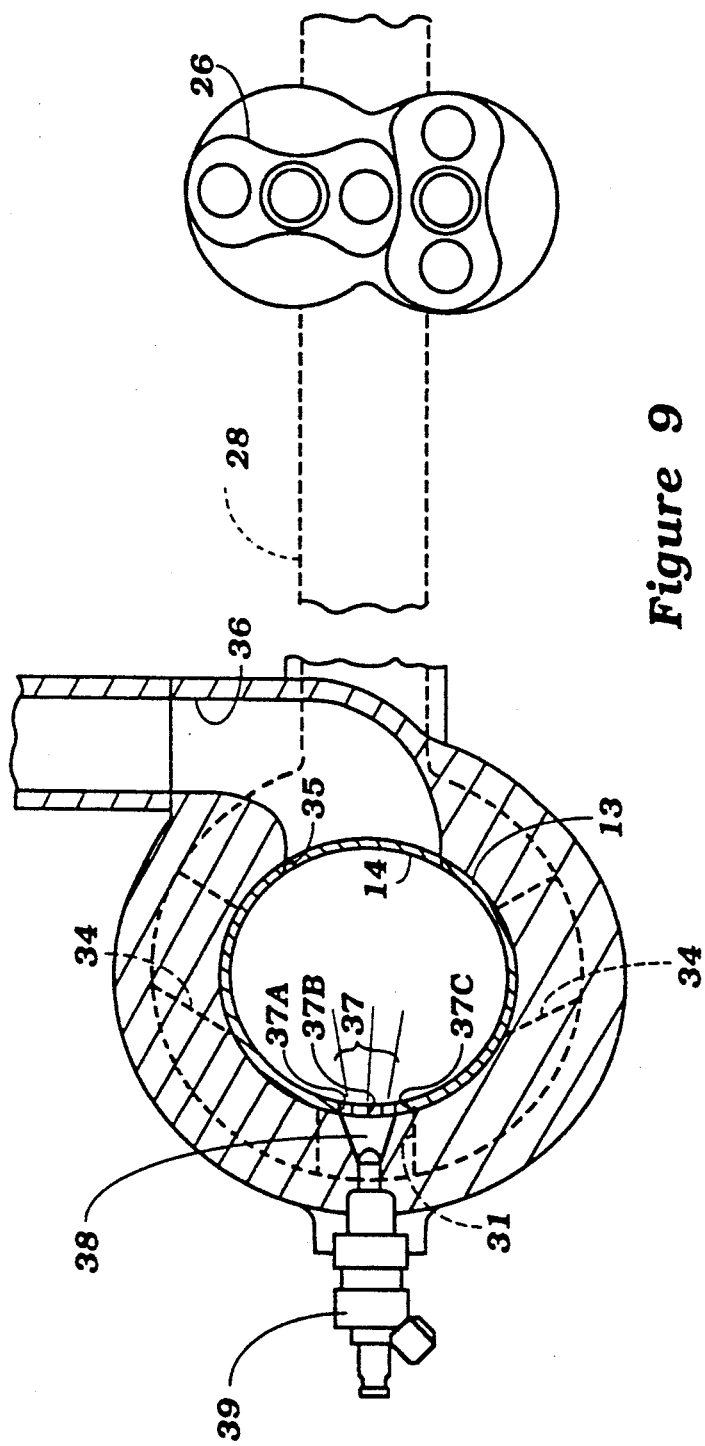
FIG. 9 is a cross sectional view taken along the line 9—9 of FIG. 8 with the scavenge pump being shown out of its true relationship to illustrate it in the system.
Figure 10:
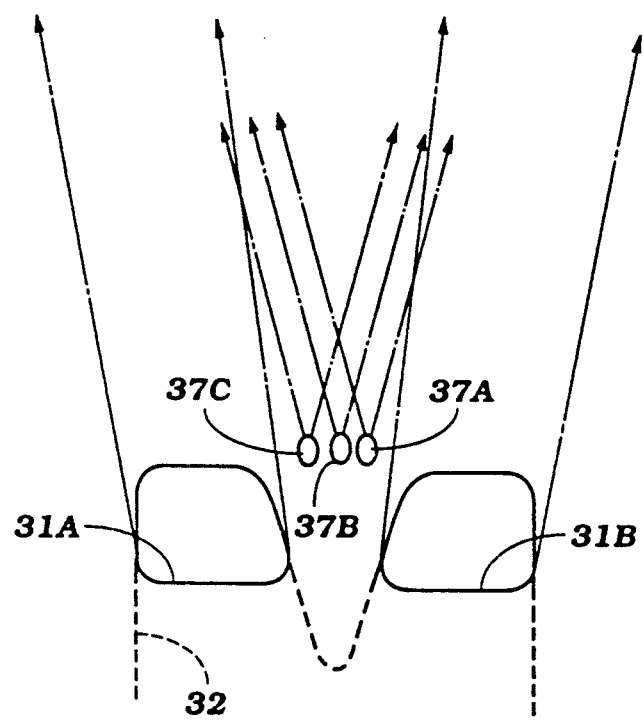
FIG. 10 is a developed view showing the relationship of the nozzle ports to the center or main scavenge port of this embodiment.
Figure 11:
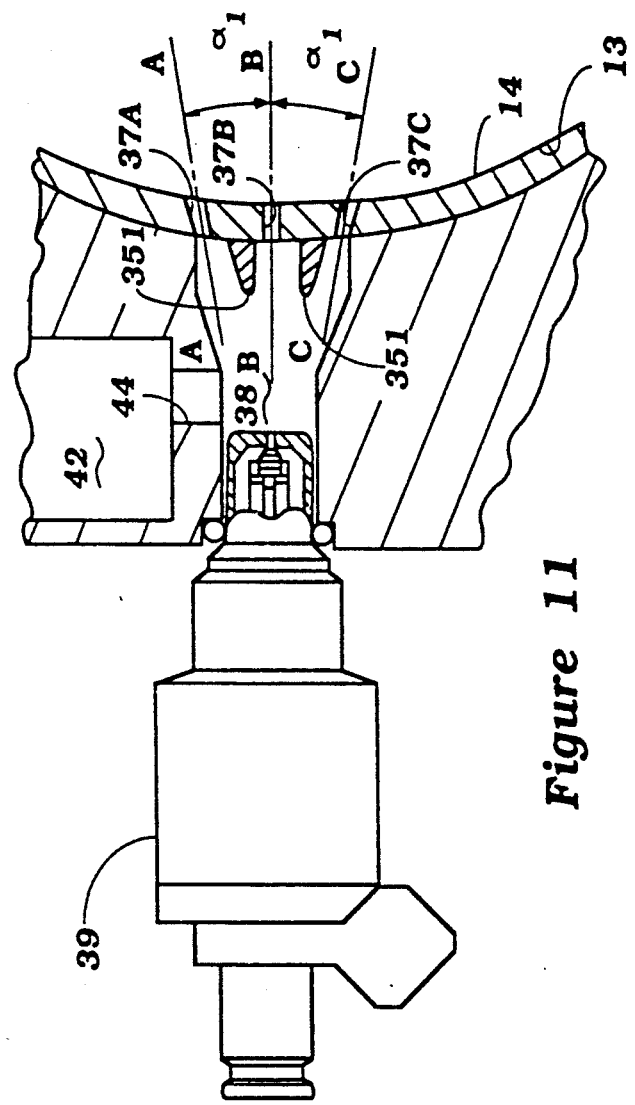
FIG. 11 is an enlarged cross sectional view taken along a plane similar to that of FIG. 9 and shows another embodiment of way in which the injection nozzle ports may be arranged.

FIGS. 8 through 10 show another embodiment of the invention which is generally similar to the embodiment of FIG. 1. For that reason, components of the engine in this embodiment which are the same as that of the embodiment of FIG. 1 have been identified by the same reference numerals and will not be described again, except insofar as is necessary to understand the construction and operation of this embodiment.

In the embodiment of FIG. 1, the scavenge pump 36 was employed as the means for pressurizing air for the chamber 42 to assist in the fuel injection from the nozzle port 37. However, there may be times when it is desired to provide a higher pressure then the pressure supplied by the scavenge pump 36 and this embodiment shows one way in which this may be done. In this embodiment, an air compressor 301 is driven from the crankshaft 17 along with the scavenge pump 36. The air compressor 301 draws pressurized air from the intake manifold 28 through an inlet port 302. A damping resonator chamber 303 is positioned downstream of the port 302 so as to maintain more uniform pressure of air passing through the port 302 through a conduit 303 to the compressor 301. The compressor 301 then discharges to the accumulator chamber 42 through a delivery conduit 304. A check valve 305 controls the communication of the delivery conduit 304 with the accumulator chamber 42.

It should be noted that this FIGURE also shows the fuel system employed with the fuel injector 39. This fuel system includes a fuel tank 306 that supplies fuel to a high pressure pump 307 which is driven in a suitable manner and which delivers the fuel to a conduit 308 in which a filter 309 is provided. The conduit 308 delivers fuel to a fuel manifold 311 which communicates with the injectors 39. A by-pass passageway 312 in which a pressure regulator 313 is positioned for returning fuel back to the tank 306 through a relief conduit 314 so as to maintain the desired fuel pressure in the manifold 311.

It has been previously noted that the nozzle port 307 may constitute a series of small holes. FIGS. 9 and 10 show how these small holes may be oriented in accordance with one feature of the invention so as to provide a wider spray path then is possible from conventional injection nozzles and also which will insure that the fuel particles from the respective openings do not impinge upon each other and thus form larger fuel droplets rather than insuring good atmosphization of the fuel.

In this embodiment, the nozzle port 37 includes three individual port openings 37A, 37B, and 37C which are disposed in this embodiment in side by side relationship as best seen in FIG. 10 which is a projected view of the cylinder liner 13. In this embodiment, the nozzle ports 37A, 37B and 37C are all disposed at substantially the same height and are disposed so as to spray at substantially the same upward angle into the cylinder bore 14. However, because of the circumferential spacing the fuel spraying from them, as may be seen in FIG. 10, will not impinge upon the spray from adjacent of the ports 37A, 37B or 37C and cause larger particles to form.

Furthermore, in this embodiment, the main scavenge port 31 is divided into two sections 31A and 31B which are circumferentially spaced from each other with the nozzle ports 37A, 37B and 37C being formed between them and opened at a slightly earlier time than the main scavenge ports 31A and 31B open. As a result of this relationship, the air charge issuing from the scavenge ports 31A and 31B will not immediately impact upon the fuel issuing from the nozzle ports 37A, 37B and 36C and hence the fuel spray will not be so widely dispersed at to adversely affect the fuel stratification. In addition, the high flow velocity of the scavenge air entering through the ports 31A and 31B will not sweep the fuel from the nozzle ports 37A, 37B and 37C directly to the exhaust port 35. Hence, hydrocarbon emissions can be substantially reduced with such an arrangement.

FIGS. 11 through 14 show another embodiment of the which is generally similar to the embodiment of FIGS. 8 through 10. In this embodiment, however, the small nozzle ports 37A, 37B and 37C do not extend parallel to each other. Rather, the center nozzle port 37B is directed in a radial direction while the ports 37A and 37C are disposed at angles $\alpha$ to the center port 31B so that the ports diverge from each other in a radial direction.

Figure 12:
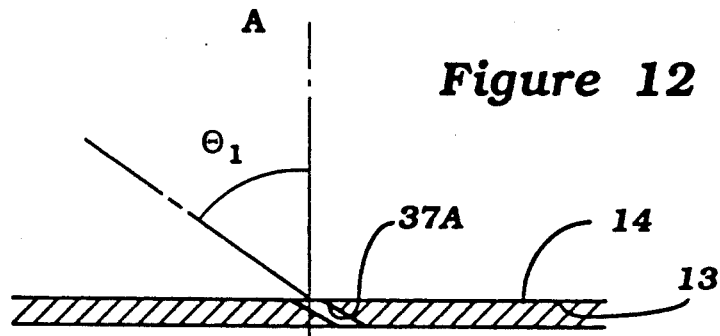
FIGS. 12 through 14 are cross sectional views taken along the planes AA, BB, and CC of FIG. 11 showing the angular disposition of the individual nozzle ports relative to the cylinder bore axis.
Figure 13:
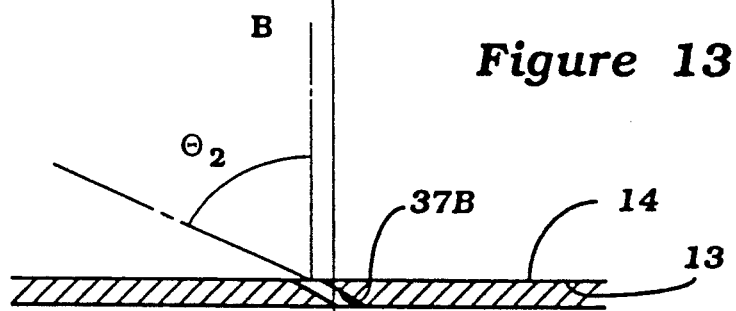
Figure 14:
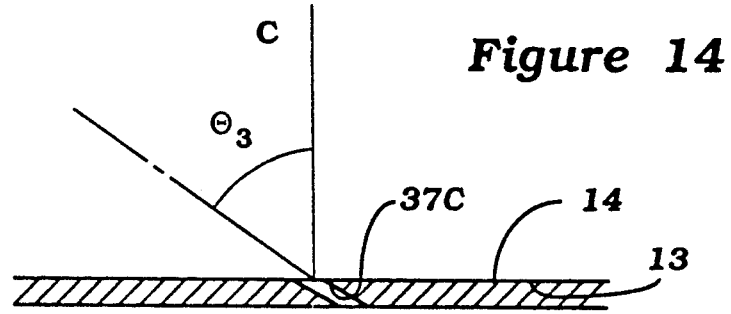

In addition and as best shown in FIGS. 12 through 14, the center nozzle port 37B is disposed at an angle $\theta_2$ to a line perpendicular to the cylinder bore axis which angle $\theta_2$ is greater than thee angles $\theta_1$ and $\theta_3$ between the nozzle ports 37A and 37B and this radial line. Hence, the nozzle port 37B will direct its flow more upwardly then the ports 37A and 37C and there will be less likelihood of impingement of the fuel flowing from the ports 37A, 37B and 37C on each other, particularly in that the areas where these ports open through the cylinder bore 14.

In this embodiment, the injection chamber 38 upstream of the nozzle ports 37A, 37B and 37C is provided with a pair of dividing walls 351 which will separate the fuel sprayed into the chamber 38 from the fuel injector 39 so that the fuel flows from the center lines of the nozzle ports 37A, 37B and 37C to further insure against impingement of the fuel issuing from the nozzle ports 37A, 37B and 37C on each other.

In this embodiment, the nozzle 37B is slightly higher then the nozzle ports 37A and 37C as also show in FIGS. 12 through 14 so the nozzle port 37B will open before an close after the remaining ports 37A and 37C.

Figure 15:
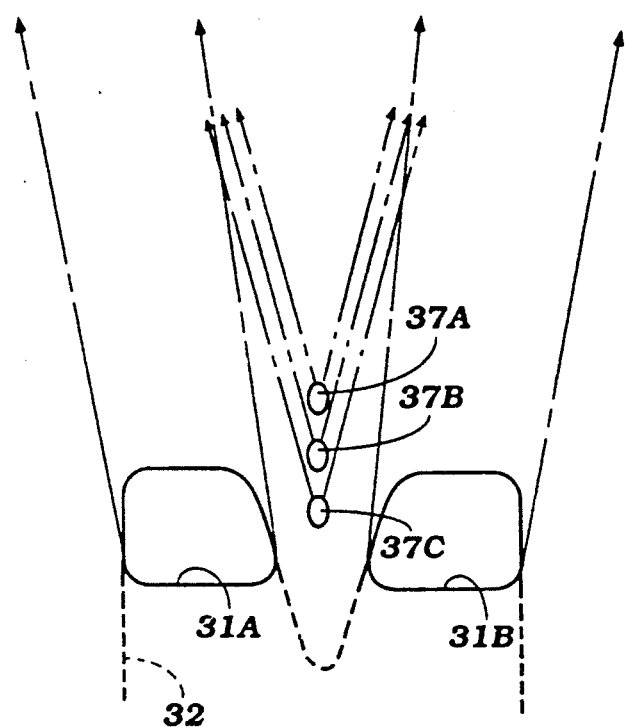
FIG. 15 is a developed view, in part similar to FIG. 10, and shows another possible arrangement for the nozzle ports.

In the embodiments as thus far described, the nozzle ports 37A, 37B and 37C have all been disposed generally at the same axial position along the length of the cylinder bore axis but have been circumferentially spaced. FIG. 15 shows another embodiment of the invention wherein the nozzle ports 37A, 37B and 37C are all disposed at the same radial position around the cylinder bore axis but are vertically positioned along the length of the axis from each other. Hence, the port 37A will open before and close after the ports 37B and 37C and the port 37B will open and close before the port 37C. In the illustrated embodiment, the port 37A opens before the scavenge ports 31A and 32B are opened, the port 37B will open at about the same time that the scavenge ports 31A and 32B open and the port 37C will open after the scavenge ports 31A and 32B are opened. Closure, of course, occurs in the opposite sequence. Again, the positioning of the nozzle ports 37A, 37B and 37C is such that the fuel issuing from them will not impinge close to the openings of the nozzle ports and hence larger particles will not be formed and fuel vaporization will be improved.

Figure 16:
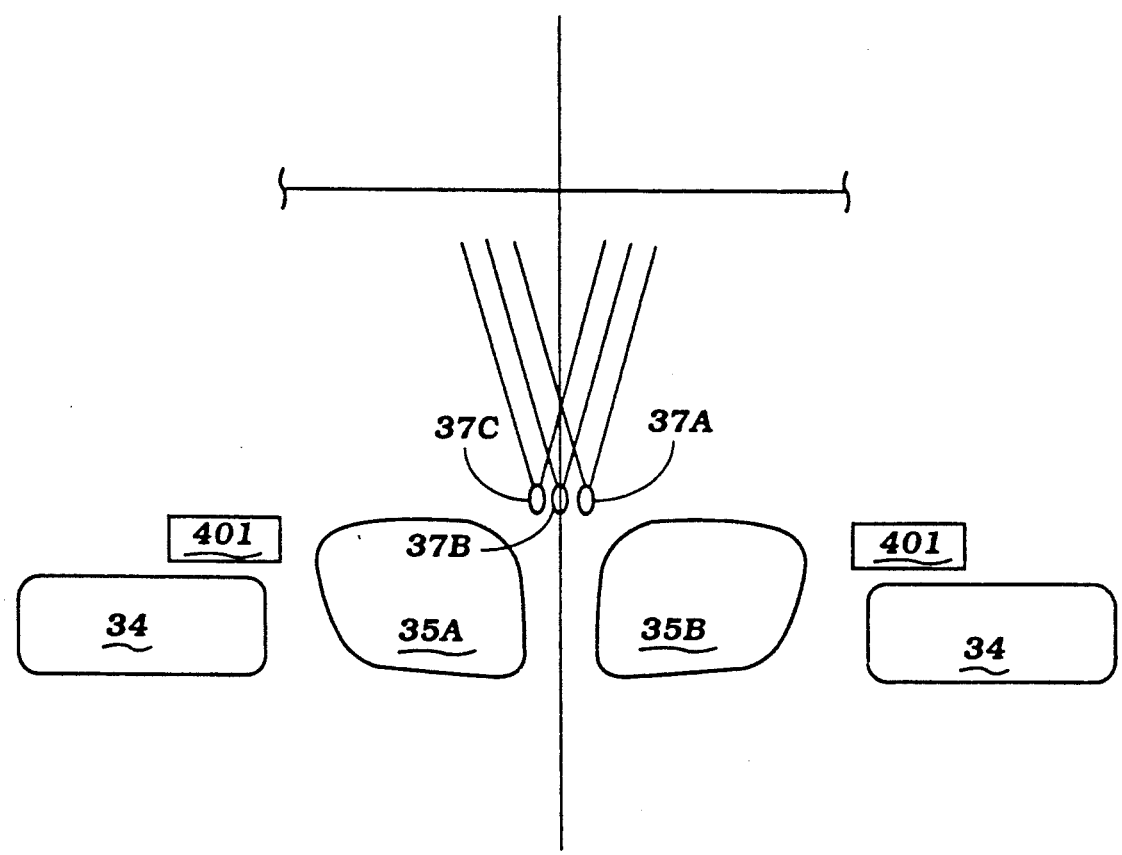
FIG. 16 is a further developed view, in part similar to FIGS. 10 and 15, and shows another relationship for the nozzle ports in relation to the intake and exhaust ports.

In all of the embodiments as thus far described, the nozzle port 37 or ports in the case plural ports are employed, as been juxtaposed to the main scavenge passage 31. As a result, the fuel is introduced in the same general direction as the flow of scavenge air into the combustion chamber. In some instances it may be desireable to have the fuel flow in an opposite direction so as to insure against any fuel being swept out of the exhaust port 35. FIG. 16 shows such an embodiment. In this embodiment, the exhaust port 35 is divided into two exhaust ports 35A and 35B which are circumferentially spaced with the nozzle ports 37A, 37B and 37C being positioned between them. This again insures against the likelihood that the air flow will cause any fuel to be swept from the exhaust ports 35A and 35B. In this embodiment, also, there are provided a pair of sub-exhaust ports 401 which are circumferentially spaced from the main exhaust ports 35A and 35B and which slightly overlap the side scavenge ports 34.

With a configuration wherein the nozzle ports 37A, 37B and 37C are disposed adjacent the exhaust ports 35A and 35B any of the previously described spacings may be employed. That is, the nozzle ports 37A, 37B and 37C may be circumferentially spaced and spray at different angles or may be aligned circumferentially and positioned axially one above the others, as shown in the embodiment of FIG. 15.

Figure 17:
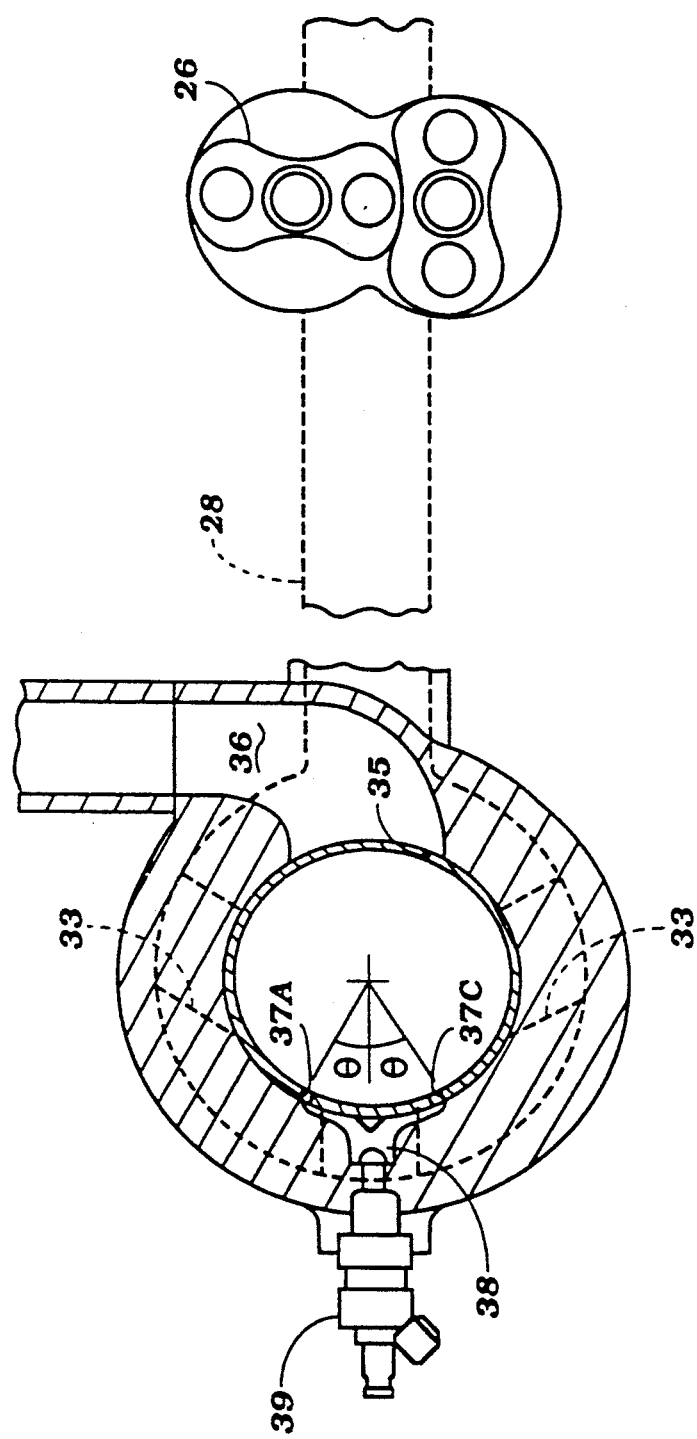
FIG. 17 is a cross sectional view, in part similar to FIG. 9, and shows a further way in which the nozzle ports may be arranged.
Figure 18:
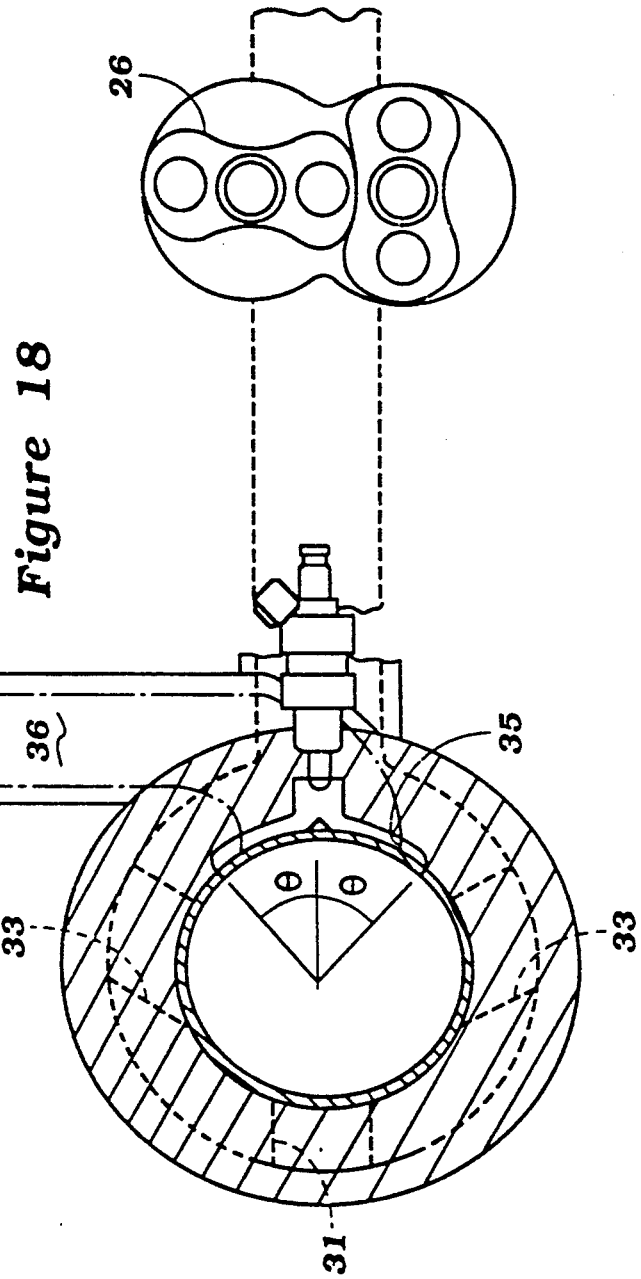
FIG. 18 is a cross sectional view, in part similar to FIGS. 9 and 17, and shows a still further way in which the nozzle ports may be dispersed.

In all of the embodiments as thus far described, the plural nozzle ports 37A, 37B and 37C have been disclosed closely adjacent each other. However, with this type of fuel injection system, it is possible to have the nozzle ports spaced a larger distance from each other than as previously described and FIGS. 17 and 18 show to such embodiments. In FIG. 17, the relationship of the nozzle ports is on the scavenge port side of the engine, as with the embodiments of FIGS. 1 through 15 while in the embodiment of FIG. 18 the nozzle ports are disposed on the exhaust port side of the cylinder. However, in each instance the nozzle ports, there being two such ports as indicated at 37A and 37C, are disposed between the side scavenge ports 44 and either the center or main scavenge port 38 as in the embodiment of FIG. 17 or the exhaust port 35 as in the embodiment of FIG. 18. In these embodiments, the ports 37A and 37C are spaced at a greater angle from the center scavenge 31 or exhaust 35 port.

Figure 19:
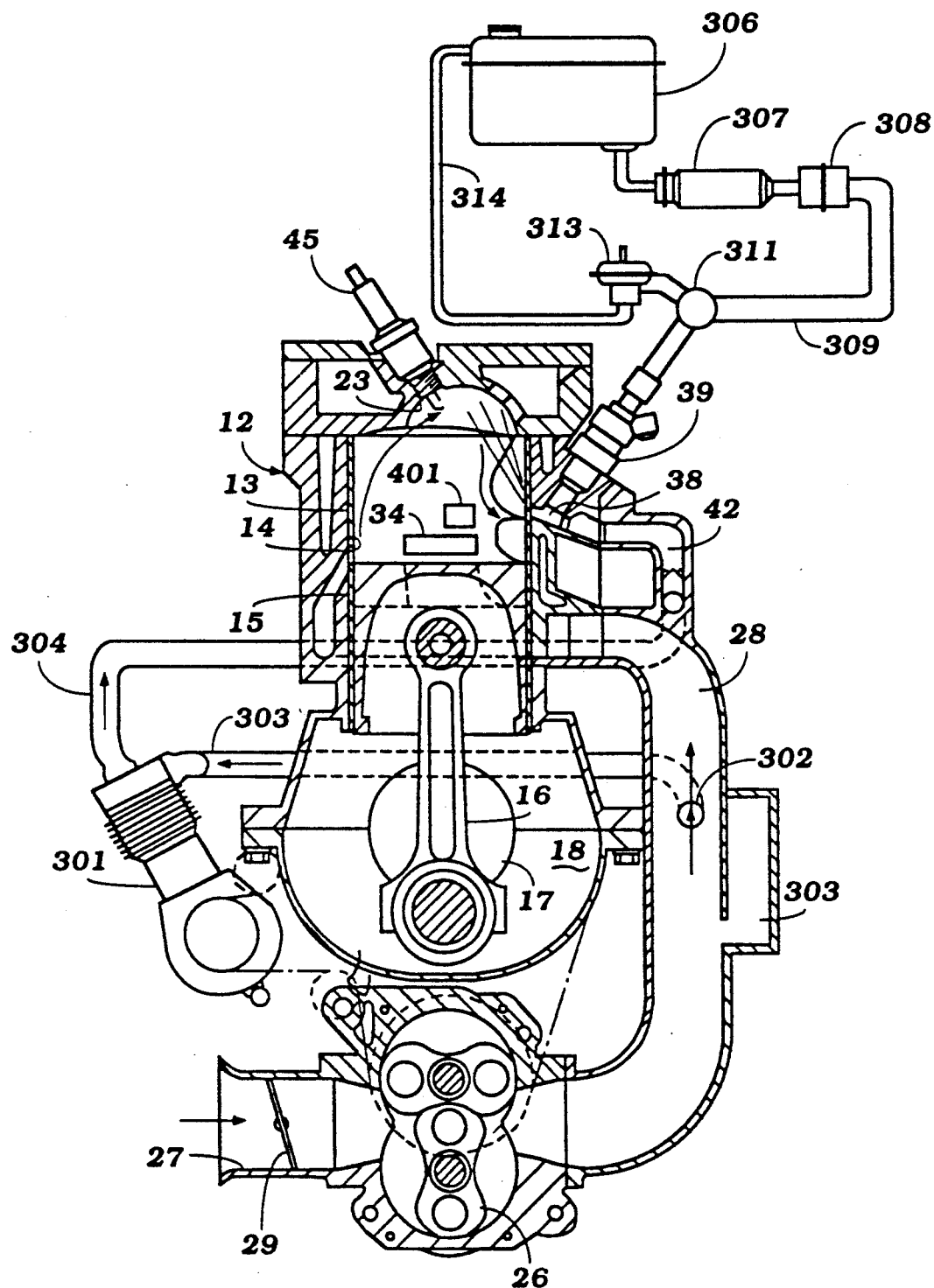
FIG. 19 is a cross sectional view, in part similar to FIGS. 1, 2, 4, 5, 6 and 8 showing how the embodiment of FIG. 18 relates to the remaining components of the engine in this embodiment and how the fuel is dispersed.

FIG. 19 is a cross sectional view in part similar to FIG. 1 and shows how the fuel will be dispersed from the nozzle ports when they are disposed adjacent the exhaust port 35. It will been seen that the fuel patch that issues from these ports will flow upwardly toward the combustion chamber recess. When the nozzle ports 37 are disposed on the exhaust port side of the engine, then the combustion chamber recess 23 should be offset from the cylinder bore axis toward this side. Since FIG. 19 otherwise conforms to the construction as shown in FIG. 8 except for the location of the combustion chamber recess 23 and the location of the nozzle ports 37 the same reference numerals have been employed for indicating the respective parts.

Figure 20:
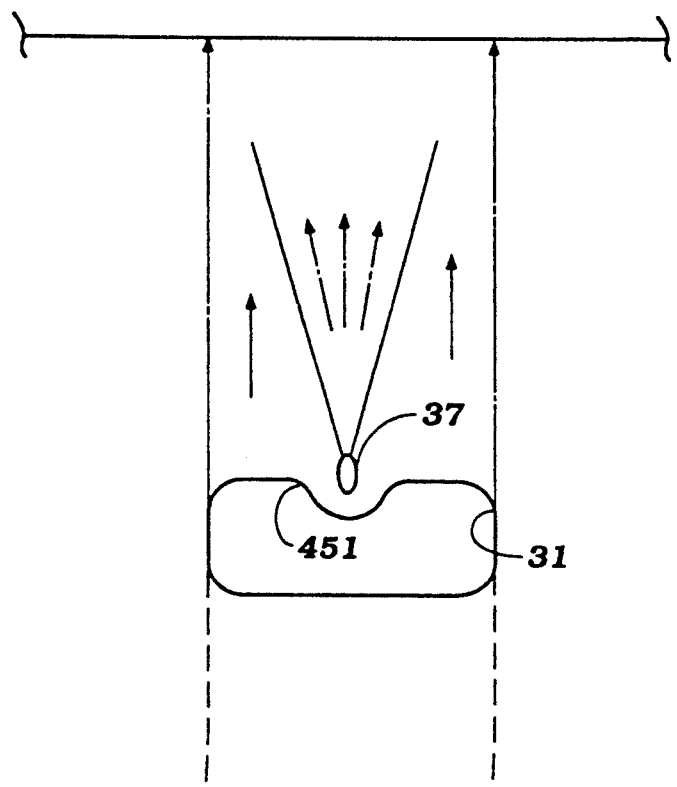
FIG. 20 is a developed view showing another possible relationship between the nozzle port and one of the scavenge ports.

FIG. 20 shows another embodiment of way in which the injection port 37 may be associated with the adjacent scavenge or exhaust port, this embodiment showing the relationship to the main scavenge port 31. In this embodiment, the main scavenge port is formed with a downwardly extending projection 451 in its central area and the injection port 37 is formed in this downwardly extending projection. Thus, the injection port 37 in this embodiment functions as if it were formed in effect in the central portion of the main scavenge port 31.

Figure 4:
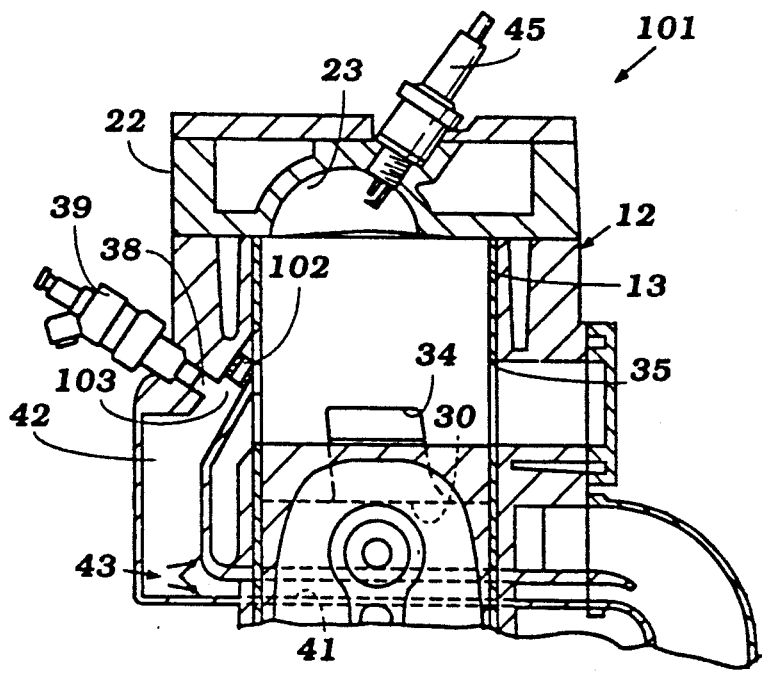
FIG. 4 is partial cross sectional view, in part similar to FIGS. 1 and 2, and shows a third embodiment of the invention.

In all of the embodiments previously described except for the embodiment of FIG. 4, the injection port has been formed primarily as a bore through the cylinder lining 13. As a result, the outer periphery of the injection port lies in the portion of the lining 13 that defines the cylinder bore 14. With such an arrangement, there may be some tendency for the fuel issuing from the injection port 37 to deposit itself on the cylinder bore 14 and flow slowly as a liquid up the cylinder liner. This is, of course, not particularly desireable.

Figure 21:
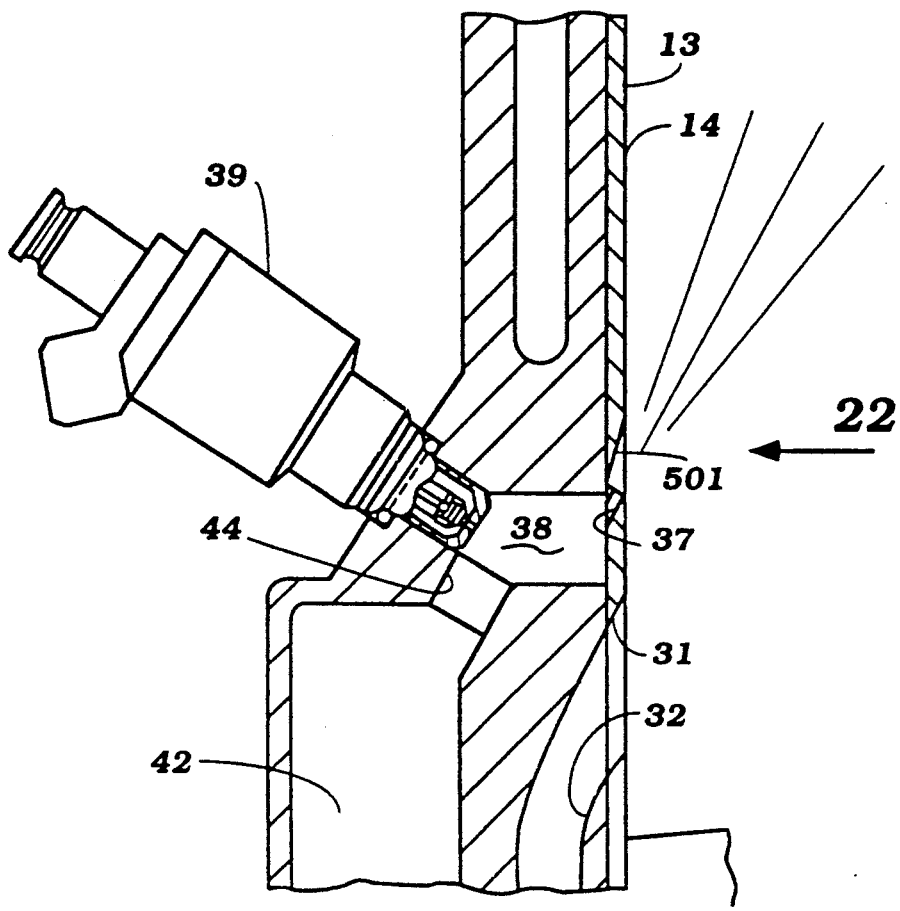
FIG. 21 is a further enlarged cross sectional view, in part similar to FIGS. 1, 2, 4, 5, 6, 8 and 19 and shows another embodiment of the invention.
Figure 22:
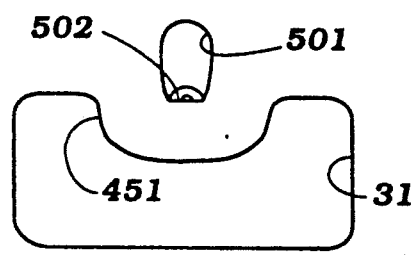
FIG. 22 is a developed view showing the relationship of the injector port to the scavenge port in this embodiment.

In the embodiment of FIGS. 21 and 22 show a way in which the outer periphery of the injection port 37 may cooperate with a recess, indicated generally by the reference numeral 501 that is formed in the cylinder liner 13 and specifically in the cylinder bore wall 14. In this embodiment, the injector port 37 extends out of a lower wall 502 formed by the recess 501 and hence has an effectively a triangular shape opening and any liquid which may condense on the wall of the recess 501 will be swept upwardly and dispersed with the air flow from the scavenge port. In this embodiment, the scavenge port 31 has a projecting portion 451 which is substantially wider than the projection of the previously described embodiment of FIG. 20.

Figure 23:
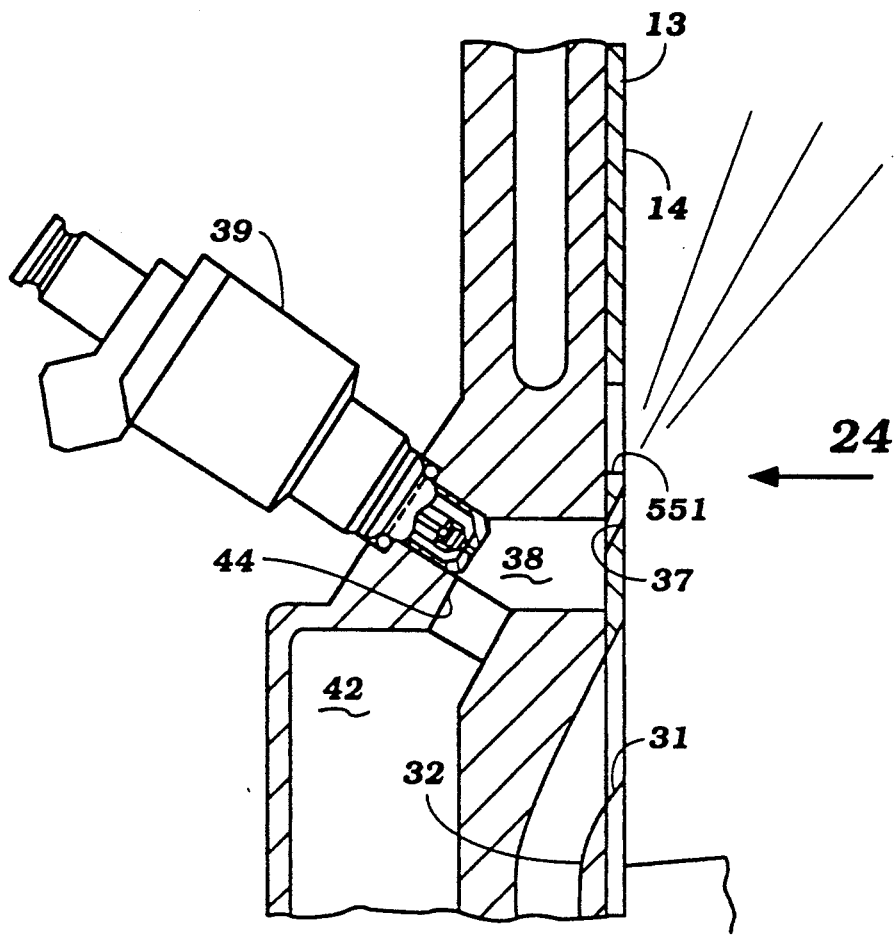
FIG. 23 is an enlarged cross sectional view, in part similar to FIG. 21, and shows another arrangement of the injector port and scavenge port.
Figure 24:
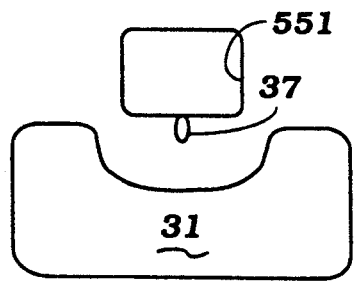
FIG. 24 is a developed view of the nozzle port and scavenge port of this embodiment.

FIGS. 23 and 24 show another embodiment that provides an arrangement for insuring against a stream fuel flowing up the cylinder bore 14 from the injection port 37. In this embodiment, a generally rectangular shape recess 551 is formed in the cylinder liner 13 above the injector port 37 and may be intersected by the upper tip of the injector port 37 as shown in FIG. 24. Again, any fuel that tends to migrate up the cylinder bore 14 will flow into the recess 551 and then be swept by the air flow to again vaporize.

In all of the embodiments of the invention as thus far described, except for the embodiment of FIG. 4, the injection ports have been formed directly in the cylinder liner of the engine and this has necessitated accurate forming of the injection port and has made the injection port such that it cannot be easily reached for servicing or changing. The embodiment of FIG. 4 employs a separate orifice 103 like a metering jet that is positioned in the communication passageway extending to the nozzle port 102. However, this embodiment also does not facilitate servicing of the orifice 103.

Figure 25:
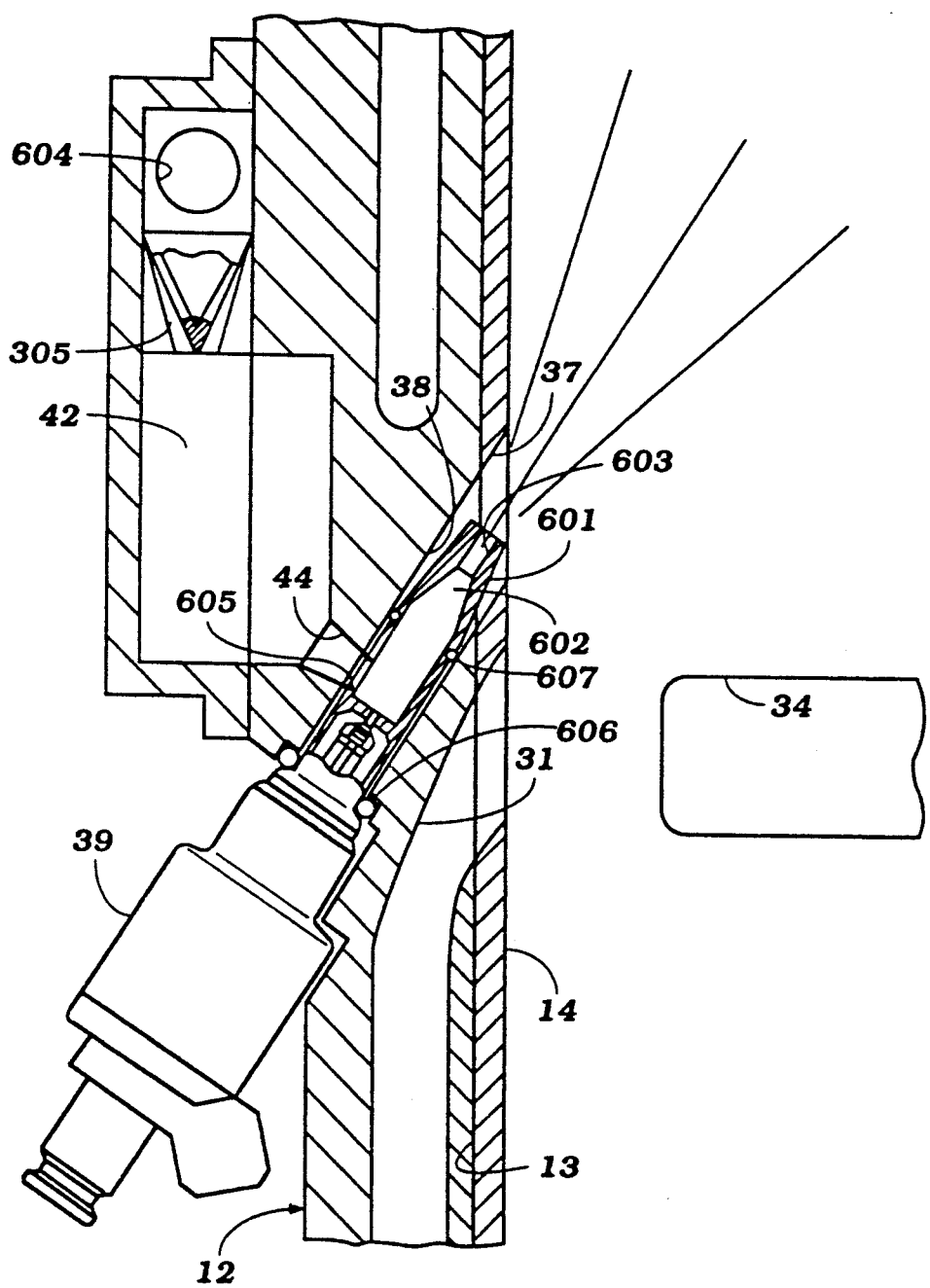
FIG. 25 is an enlarged cross sectional view, in part similar to FIGS. 21 and 23, and shows a still further embodiment of the invention.

FIG. 25 shows an embodiment of the invention wherein the flow controlling injection port is not formed directly in the cylinder liner but is also formed in such a way in which the unit can be removed for servicing, inspection and replacement, if desired to provide other calibrations. This embodiment incorporates a structure generally similar to the embodiment of FIG. 8 and, for that reason, components of this embodiment which are similar to or the same as that embodiment have been identified by the same reference numerals. Also, in view of these similarities, only a single cross sectional view is believed necessary to understand the construction and operation of this embodiment.

In this embodiment, the chamber 38 is formed as a bore in the cylinder block 12 and the injection port 37 in the liner 13 has substantially the same diameter. The fuel injector 39, however, has a nozzle portion 601 formed integrally with it and which defines an internal chamber 602 into which fuel is injected from the injector 39. A small injector port 603 communicates the chamber 602 with the chamber 38 immediately adjacent the nozzle port 37.

In this embodiment, the chamber 42 is formed in the side of the cylinder block 12 and receives air under pressure from the air compressor (not shown) through a conduit 604. A bore 605 in the nozzle portion 601 permits this air to enter the chamber 602 and mix with the fuel injected by the injector 39 before discharge through the injection port 37 when it is opened.

A pair of O ring seals 606 and 607 seal the injector 39 to the chamber 38. It should be readily apparent that the injector 39 may be easily removed and the portion 601 replaced to change the amount of fuel that may be metered and also to provide servicing of all of the components.

Figure 26:
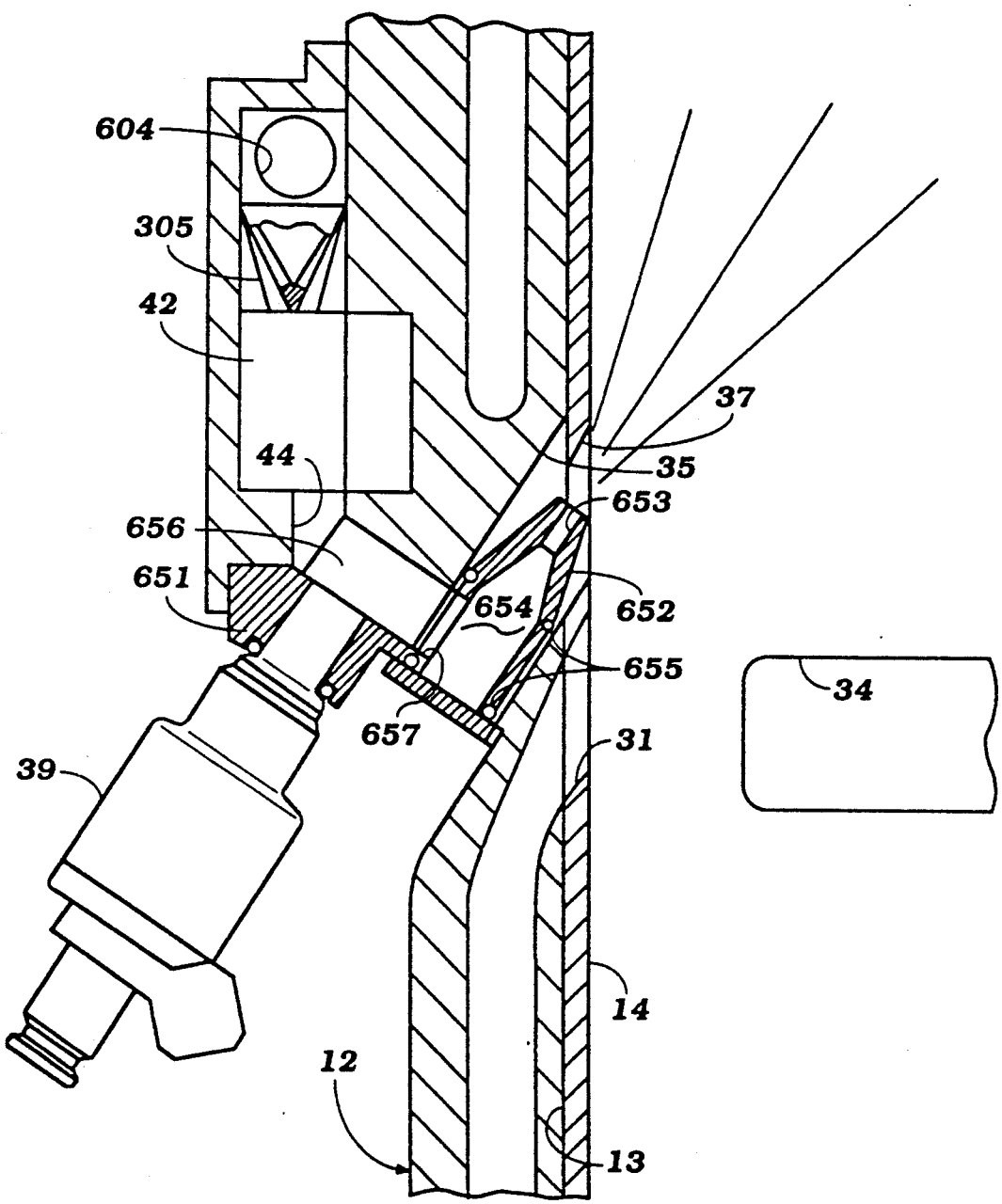
FIG. 26 is an enlarged cross sectional view, in part similar to FIGS. 21, 23 and 25 an shows yet another embodiment of the invention.

FIG. 26 shows an embodiment similar to the embodiment of FIG. 25 however, in this embodiment the injector 39 is not formed with the integral portion 601 but rather an insert 651 is provided which is inserted into the cylinder block 12 in a manner which will be described. Since this embodiment is generally the same, except as will hereinafter be noted as the embodiment of FIG. 25, the same reference numerals have been employed for identifying the same or similar components.

It should be noted that an insert 651 has a nozzle portion 652 in which a nozzle port 653 is formed. The nozzle port 653 communicates the chamber 38 and a chamber 654 formed by the nozzle portion 652. A pair of O ring seals 655 seal the nozzle portion 652 with the bore 37.

A chamber 656 is formed in the cylinder block 12 and the fuel injector 39 sprays into this chamber. Air under pressure will flow from the chamber 42 through the passage 44 and enter the chamber 656 so as to mix with the fuel injected by the injector 39. This fuel air mixture is then sprayed into the chamber 654 through a port 657 for discharge through the port 653 when the injection port 37 is opened.

Figure 27:
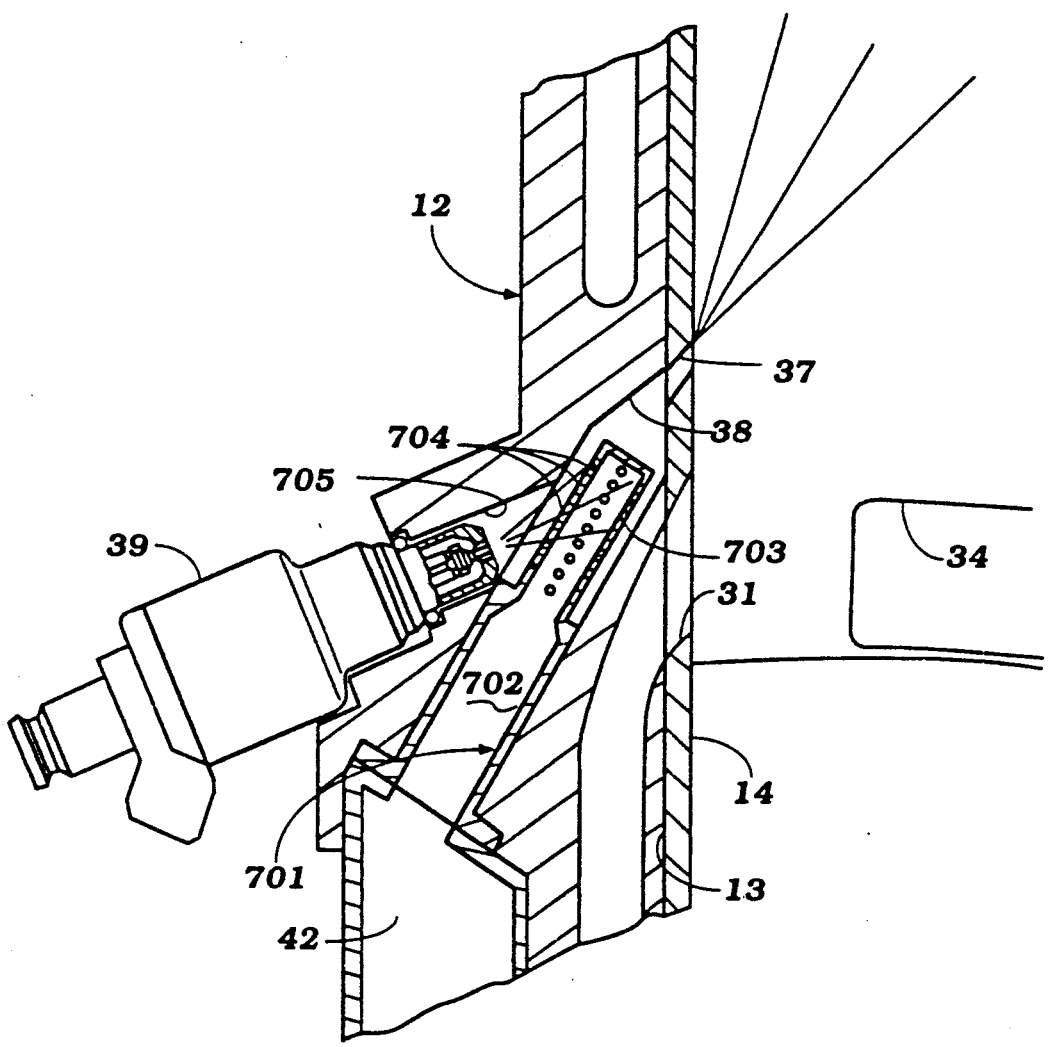
FIG. 27 is an enlarged cross sectional view, in part similar to FIGS. 21, 23, 25 and 26 and shows yet another embodiment of the invention.

Because of the fact that the fuel injector 39 sprays into a relatively small chamber there is some concern of the possibility of fuel condensation occurring. FIG. 27 shows an embodiment of the invention that incorporates an arrangement for minimizing the adverse effects of such fuel condensation. In this embodiment, a perforate number, indicated generally by the reference numeral 701 is inserted into the chamber 38 and has a generally cylindrical cavity 702 that communicates directly with the chamber 42. A smaller diameter portion 703 of the perforate number 701 is formed with a plurality of small diameter holes 704 which will not significantly inhibit the air flow from the chamber 42 out the injection port 37 when the injection port is opened.

A fuel injector 39 is supported within a bore 705 of the cylinder block 12 which intersects the chamber 38 so that the spray from the injector 39 will impinge in substantial part on the outer periphery of the perforate member portion 703. As a result of this, any fuel which may tend to condense will be swept by the rapid air flow through the perforated openings 704 and mix for discharge through the injector port 37. As a result, fuel atomization will be achieved and the likelihood of any fuel not being discharged from the injector port 37 when it is opened will be substantially minimized.

Figure 28:
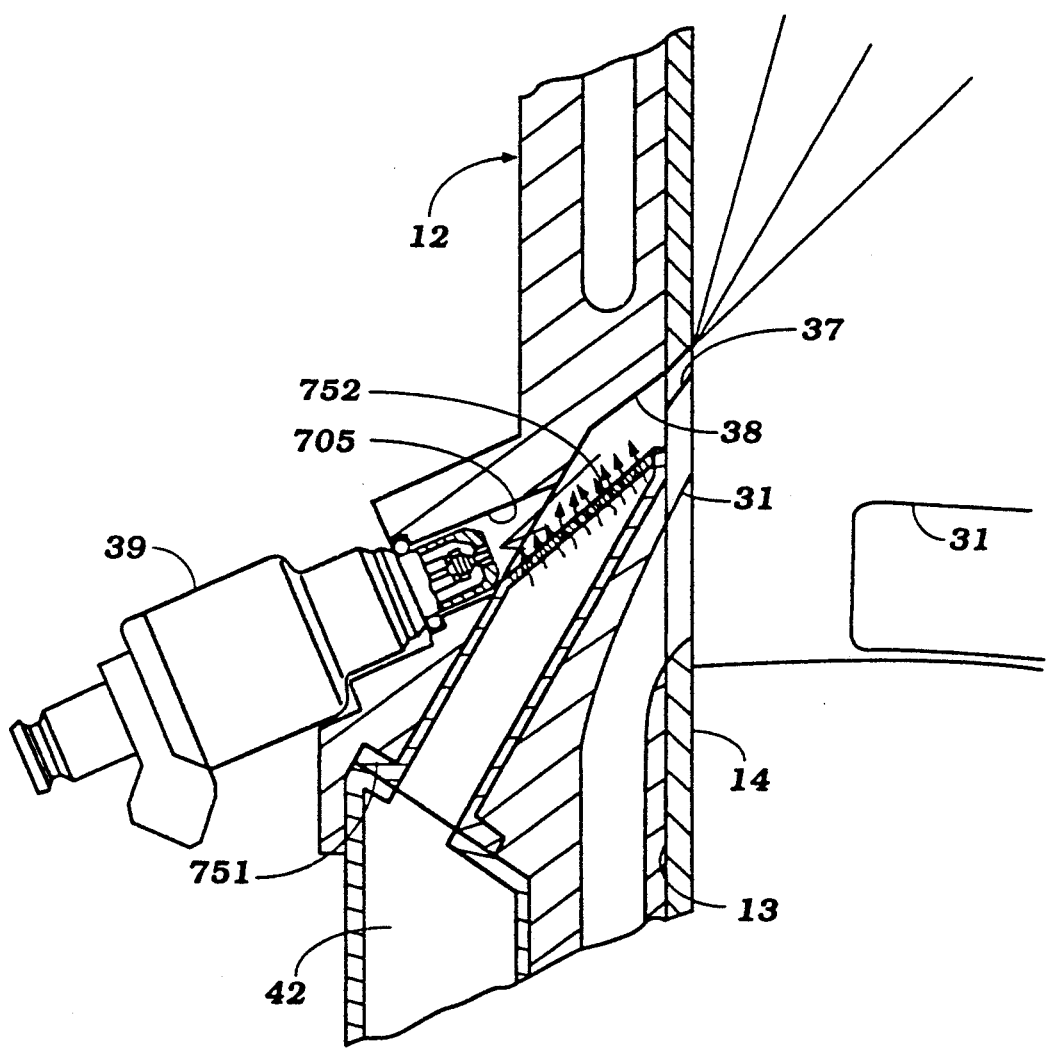
FIG. 28 is a cross sectional view, in part similar to FIGS. 21, 23, 25, 26 and 27 and shows a still further embodiment of the invention.

FIG. 28 shows another embodiment which is similar to the embodiment of FIG. 27 but which differs in the configuration of the perforate number. For this reason, the same reference numerals have been employed to identify similar components. In this embodiment, an insert 751 is placed in the cavity 38 in communication with the chamber 42. The member 751 is generally cylindrical and has an opening at its upper end across which a perforate screen 752 is positioned. The perforate screen 752 is disposed so as to be intersected by the spray of fuel from the fuel injector 39 so that the air flowing through the perforate member 752 will aid in atomization of the fuel as with the previously described embodiment.

Figure 29:
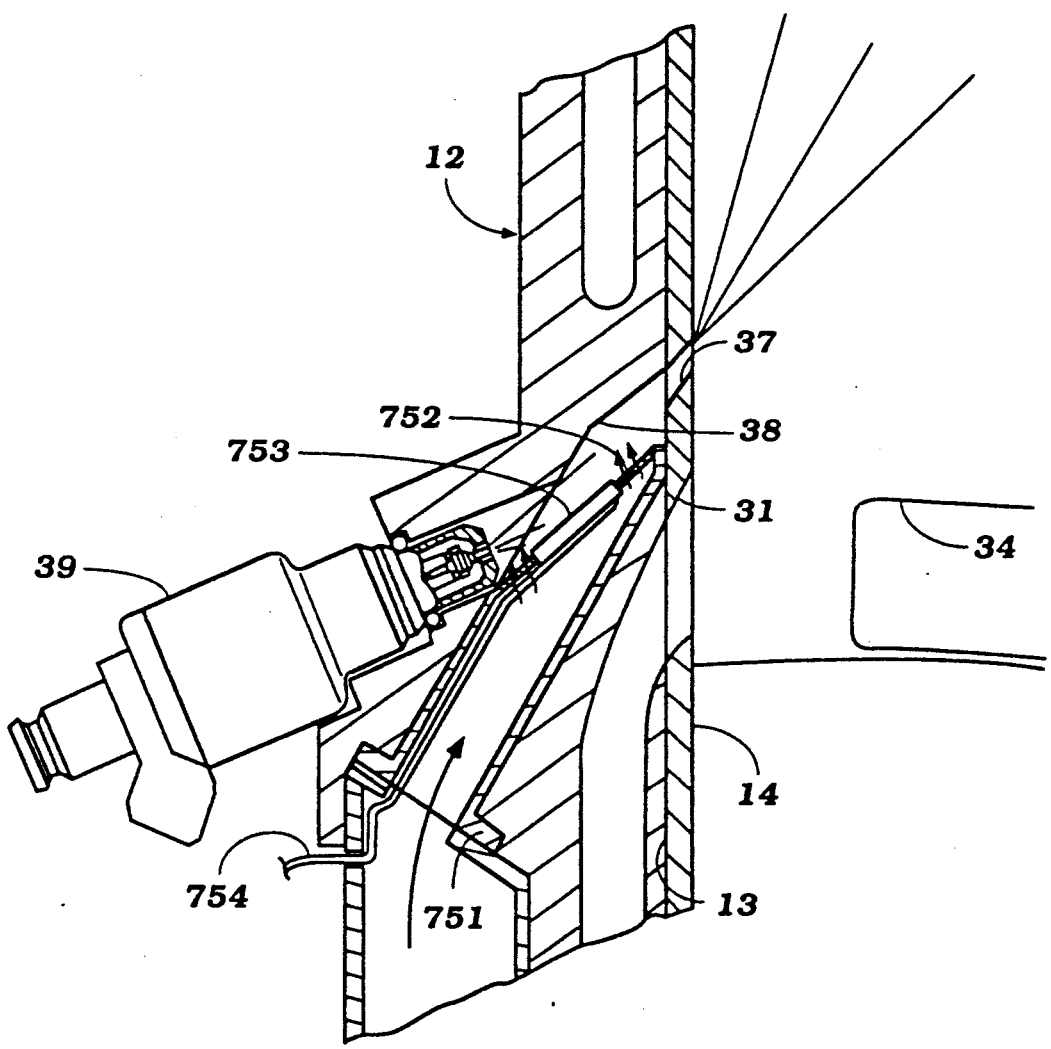
FIG. 29 is a cross sectional view, in part similar to FIGS. 21, 23, 25, 26, 27 and 28 and shows yet another embodiment of the invention.

FIG. 29 shows another embodiment which is generally similar to the embodiment of FIG. 28. In this embodiment, however, the perforate member 752 is provided with a heater 753 so as to heat the fuel issuing from the fuel injector 39 as well as the fuel which impinges on the perforate member 752. In fact, the heater 753 will also heat the chamber 38 so as to further promote fuel vaporization. The heater 753 may be of the solid state type and has a pair of leads 754 that extend outwardly from beyond the cylinder block 12 for connection to an appropriate power source and switching arrangement, if the latter is desired.

Figure 30:
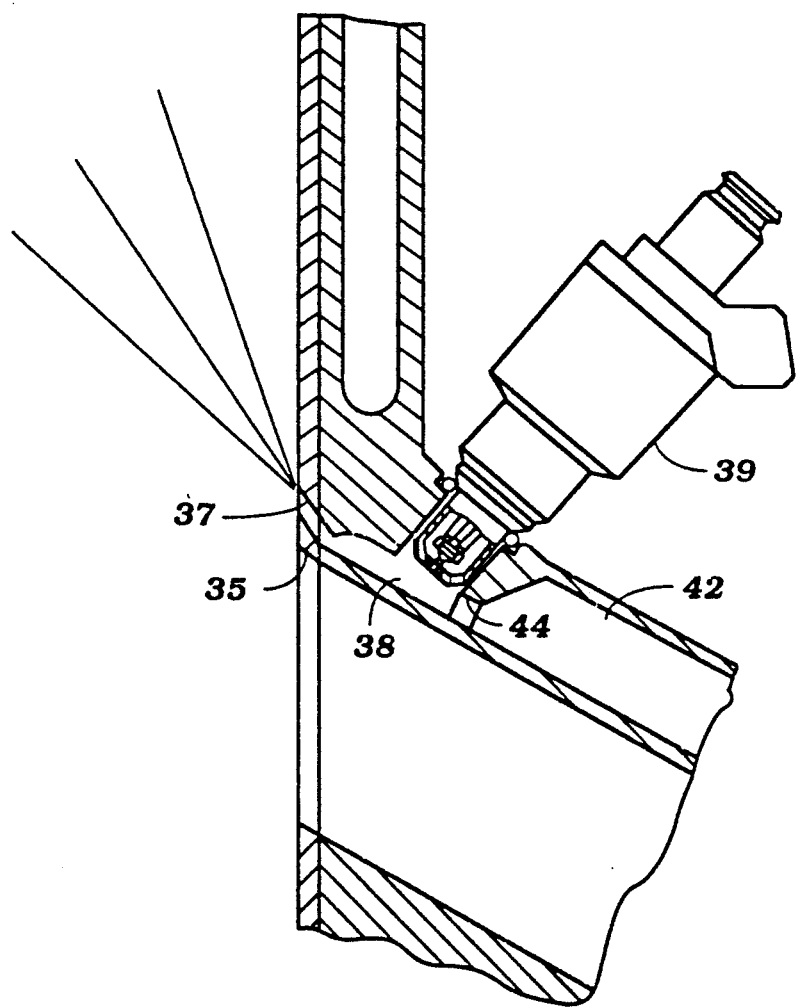
FIG. 30 is an enlarged cross sectional view taken through the area adjacent the exhaust port of yet another embodiment of the invention.

FIG. 30 illustrates another embodiment of the invention wherein the fuel vaporization is promoted through the use of a heating device. This embodiment is generally similar to the embodiment of FIG. 19 in that the injector port 37 is disposed adjacent the main exhaust port 35. In addition, the chamber 38 is disposed in line with and immediately adjacent the exhaust passage so that it will be heated and, accordingly, fuel vaporization will be promoted.

It should be noted that in all of the embodiments there has been an orifice or restricted passageway communicating with the chamber 38 where the fuel is injected by the injector 39. This restricted passageway 44 will insure that even if fuel is injected by the injector 39 when the injection port 37 is closed that the fuel will not pass back into the chamber 42. However, it is desirable to insure that the fuel is all purged from the chamber 38 during each cycle of operation. That is, all of the fuel sprayed into the chamber 38 by the injector 39 should be exhausted by the time the injector port 37 is closed.

If this is not done then fuel will remain in the chamber 38 and the next time the injector port 37 is opened, the high pressure will cause the fuel to be sprayed into the combustion chamber immediately upon opening of the injector port 37. However, this early fuel injection is not desirable since it may cause some fuel to be swept out of the exhaust system causing poor fuel economy as well as an increase in the amount of unburned hydrocarbons in the exhaust gases. In accordance with an important feature of the invention, therefore, an arrangement and control system is incorporated so as to insure that all of the fuel will be injected into the chamber 38 by the injector 39 at a time sufficiently in advance of the closing of the injector port 37 that all fuel will be depleted from the chamber 38 by the time the injector port 37 is closed. How this is accomplished will now be described by reference to FIGS. 31 through 34.

Figure 31:
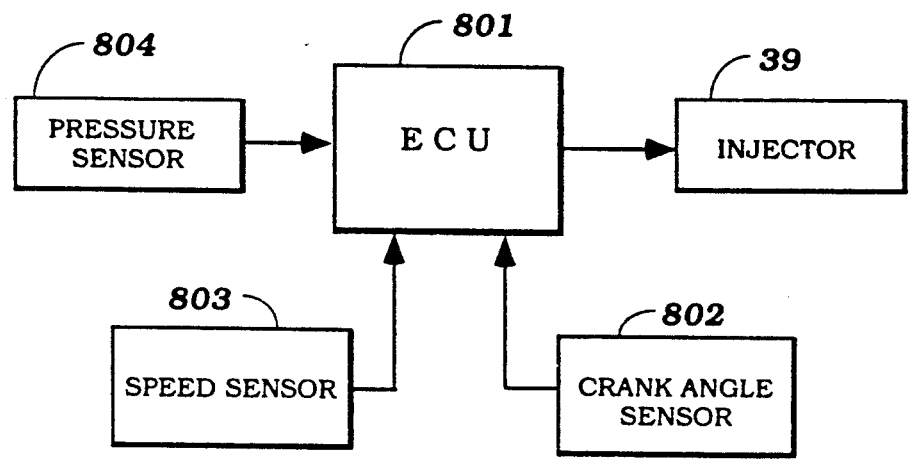
FIG. 31 is a schematic view showing the control elements for the fuel injection system.
Figure 32:
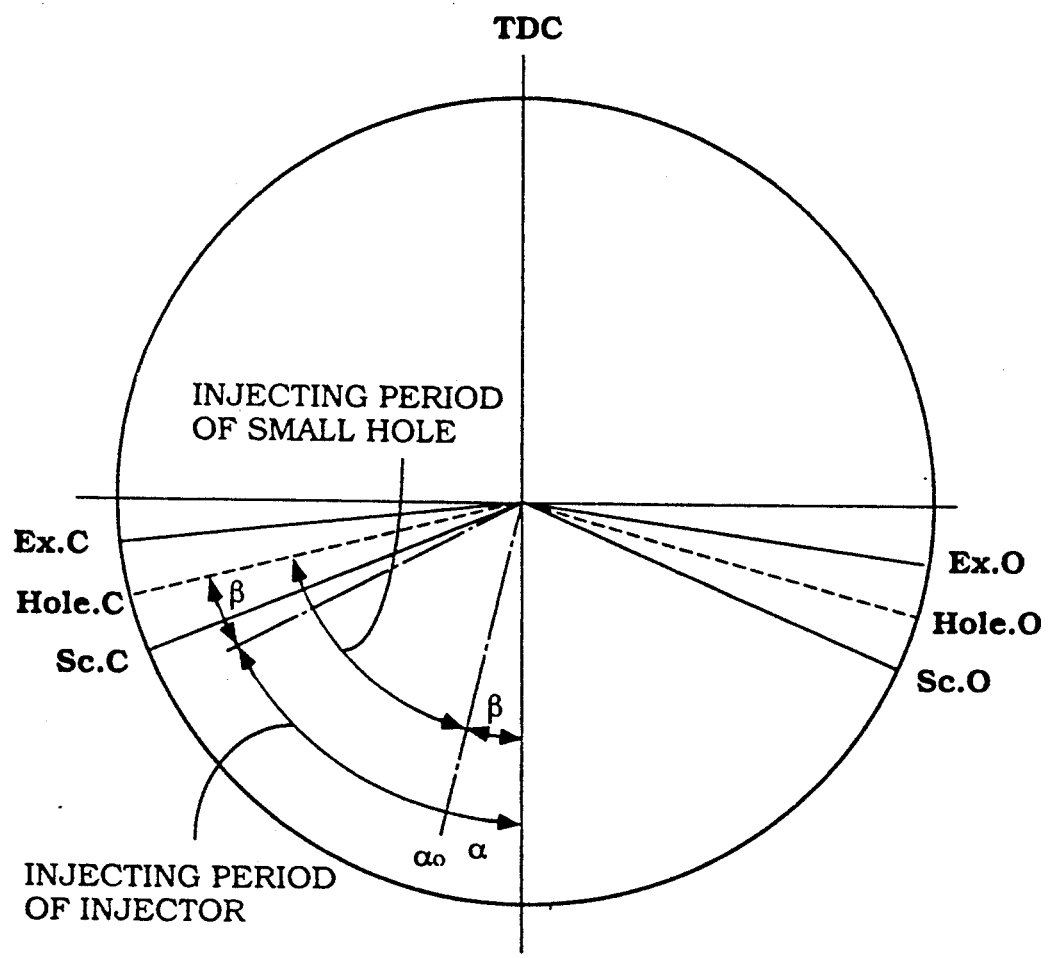
FIG. 32 is a timing diagram showing the opening and closing of the various ports and injection of fuel during a single cycle of operation.
Figure 33:
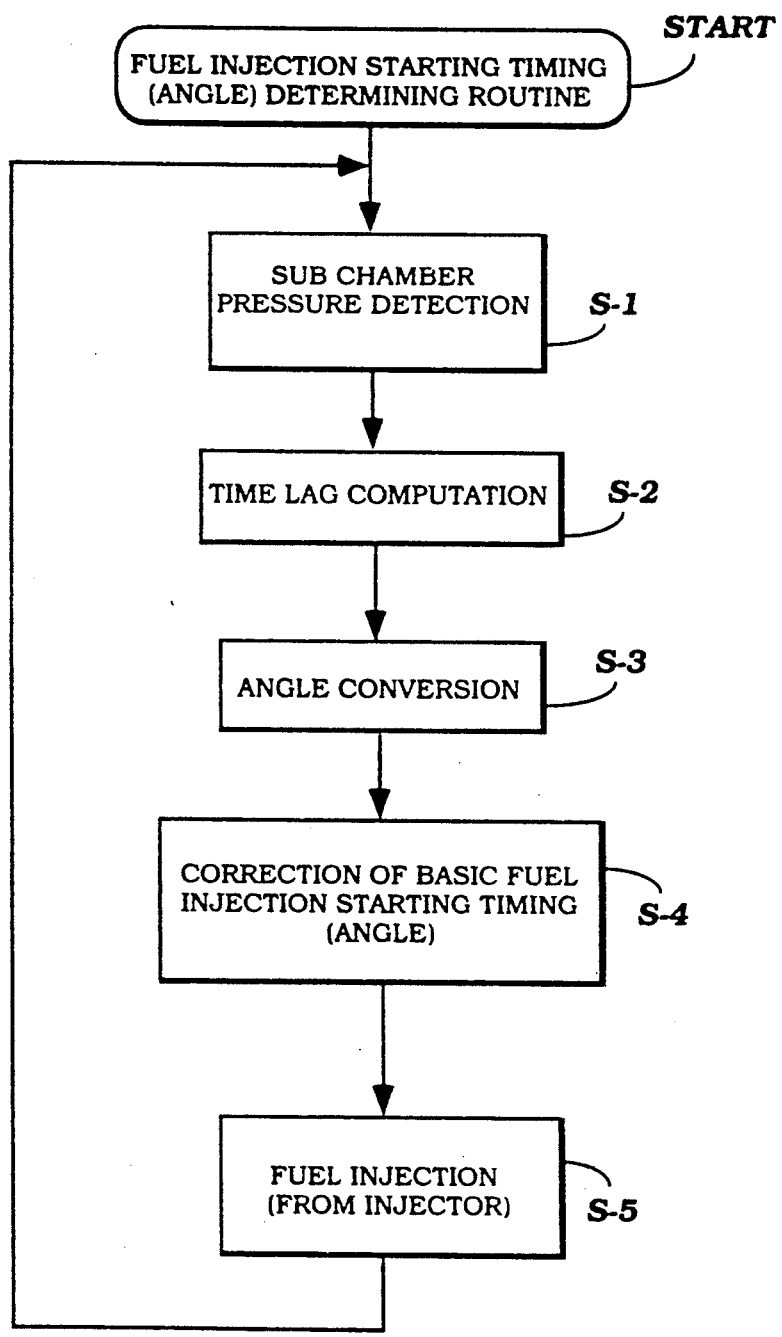
FIG. 33 is a block diagram showing the control routine for the fuel injection system.

Referring first to FIG. 31, the components of the system for the control are illustrated schematically and where the injector 39 is shown in block form. The injector 39 is controlled by an ECU 801 which received input signals from various sensors such a crank angle sensor 802 that provides a signal indicative of the angle of the crankshaft 17, a speed sensor 803 that provides a signal indicative of the speed of operation of the engine and a pressure sensor 804 that provides a signal indicative of the pressure in the chamber 38 where fuel is injected by the injector 39.

The ECU 801 is designed so as to provide the necessary amount of fuel injection in the terms of duration depending upon the engine speed and load as provided by respective sensors, which may include sensors in addition to those already shown. In addition, the timing of injection is controlled in response to the pressure in the chamber 38 and the distance between the area where fuel is injected by the injector 39 and the injector port 37 so as to insure that all fuel will be discharged before the injector port 37 is closed. As the load on the engine increases, the amount of fuel injected is increased by advancing the time at which the injector 39 begins to inject fuel.

As has been previously noted, the time at which the final fuel injected from the injector 39 takes to reach the injector port 37 will be depend upon the pressure in the chamber 38 and the distance between the nozzle of the injector 39 and the nozzle port 37. This travel provides a time lag T which is may be determined from the following equation:

$$T = \frac{kd}{\sqrt{\frac{2P}{D}}}$$

Wherein
k equals a correction coefficient.
d equals the distance between the injection nozzle 39 and the injector port 37.
P equals the pressure in the chamber 38 as sensed by the pressure sensor 804.
D equals the density of the mixture in the chamber 38.

If the time of injection is set so as to conclude at the same time when the injector port 37 is closed, it should be readily apparent that the fuel last injected by the injector 39 will not be able to travel to the injection port 37 for discharge and will be trapped in the chamber 38.

Figure 34:
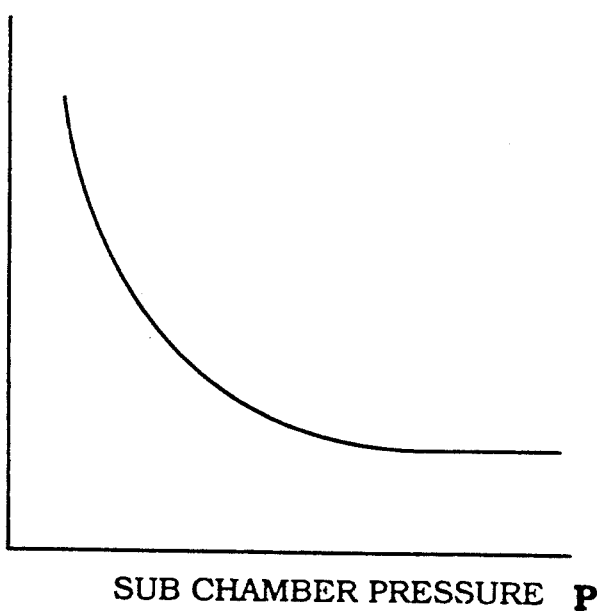
FIG. 34 is a graphical view showing the relationship of the correction angle to the pressure in the chamber in which the fuel in injected.

Therefore, using the aforenoted correction, the timing of injection is advanced by an angle $\beta$ in relation to crank angle so that the last fuel is injected before the injection port 37 is closed and with sufficient time for all of the fuel to issue from the injection port 37 from the chamber 38. The angle $\beta$ is computed, as will be described later, to coincide with the real time required for this fuel to travel to the injection port 37. That is, real time is converted to crank angle. The way that this is done will now be described by reference to FIG. 33, which is a block diagram showing the control routine for the ECU 801. The program starts and then moves to the step S-1 to determine the pressure in the chamber 38 by the pressure sensor 804 as aforenoted. The program then moves to the step S-2 to determine the time lag that it will take for fuel to travel from the injector 39 through the chamber 38 to the injector port 37. FIG. 34 is a curve showing the correction angle $\beta$ is related to subchamber pressure P. It will be seen that the higher the subchamber pressure the smaller the correction angle will be. The reason for this is that the higher the air pressure the greater the velocity of the air that will flow out of the injection port 37 and, accordingly, the faster the fuel will travel.

The program then moves to the step S-3 to covert the time determined from the step S-2 to the actual angle $\beta$.

The program then moves to the step S-4 so as to superimpose this correction angle on the actual timing angle as mapped into the ECU 801 and the program then moves to the step S-5 so as to initiate and terminate fuel injection from the injector 39.

It should be readily apparent from the foregoing description that the described embodiments of the invention provide an extremely good injection system which incorporate the advantages of fuel/air injectors and of direct cylinder injection without carrying over the disadvantages of these systems. Of course, the foregoing description is that of preferred embodiments of the invention and various changes and modifications may be made without departing from the spirit and scope of the invention, as defined by the appended claims.

We claim:

1. A fuel injection system for an internal combustion engine comprising a pair of relatively moveable components defining a combustion chamber, means defining a chamber an injection portion formed in one of said components for sequentially opening and closing said injection port upon relative movement of said components, means for delivering a pressurized gas to said chamber, said chamber being in open unvalved communication with said injection port for pressurized air flow from said chamber through said injection port when said injection port is opened by relative movement of said components, a fuel injector for spraying fuel into said chamber at a place spaced from said injection port, and means for initiating the beginning and ending of injection of fuel from said fuel injector so that all fuel injected into said chamber during each cycle when said injection port is opened will be discharged from said injection port before said injection port is closed.

2. A fuel injection system as set forth in claim 1 wherein the termination of injection is timed so that at least the last fuel injected will pass out of the injection port immediately prior to the closure of the injection port.

3. A fuel injection system as set forth in claim 1 wherein the timing of the injection is adjusted in relation to the distance between the fuel injector and the injector port, 4. A fuel injection system as set forth in claim 1 wherein the timing of fuel injection is adjusted in relation to the pressure in the chamber.

5. A fuel injection system as set forth in claim 4 wherein the timing is also adjusted by the distance between the fuel injector and the injection port.

6. A fuel injection system as set forth in claim 1 wherein the engine is a reciprocating engine and the relatively moveable components include a cylinder and a piston reciprocating in the cylinder.

7. A fuel injection system as set forth in claim 6 wherein the injector port is formed in the wall of the cylinder.

8. A fuel injection system as set forth in claim 7 wherein the termination of injection is timed so that at least the last fuel injected will pass out of the injection port immediately prior to the closure of the injection port.

9. A fuel injection system as set forth in claim 7 wherein the timing of the injection is adjusted in relation to the distance between the fuel injector and the injector port.

10. A fuel injection system as set forth in claim 7 wherein the timing of fuel injection is adjusted in relation to the pressure in the chamber.

11. A fuel injection system as set forth in claim 10 wherein the timing is also adjusted by the distance between the fuel injector and the injection port.

12. A fuel injection system as set forth in claim 7 wherein the engine is a ported engine and the injection port is disposed immediately adjacent a scavenge port of the engine.

13. A fuel injection system as set forth in claim 7 wherein the engine is a ported engine and the injection port is positioned immediately adjacent an exhaust port of the engine.

14. A fuel injection system as set forth in claim 1 further including a perforated member contained within the chamber and through which at least a portion of the pressurized gas must flow before exiting from the injection port and wherein the fuel injector is disposed to inject at least a portion of its fuel onto the perforated member.

15. A fuel injection as set forth in claim 1 further including means for heating the chamber.

16. A fuel injection system as set forth in claim 15 further including a perforated member contained within the chamber and through which at least a portion of the pressurized gas must flow before exiting from the injection port and wherein the fuel injector is disposed to inject at least a portion of its fuel onto the perforated member.

17. A fuel injection system as set forth in claim 15 wherein the means for heating the chamber comprises means for heating the walls of the member forming the chamber.

18. A fuel injection system as set forth in claim 17 wherein the heating means comprises a fluid heated by the engine operation.

19. A fuel injection system as set forth in claim 18 wherein the heated fluid comprises an exhaust gas from the engine.

20. A fuel injection system as set forth in claim 15 wherein the engine is a reciprocating engine and the components comprise a cylinder and a piston reciprocating in the cylinder.

21. A fuel injection system as set forth in claim 20 wherein the means for heating the chamber comprises a heater disposed in the chamber.

22. A fuel injection system as set forth in claim 20 wherein the means for heating the chamber comprises means for heating the walls of the member forming the chamber.

23. A fuel injection system as set forth in claim 22 wherein the heating means comprise a fluid heated by the engine operation.

24. A fuel injection system as set forth in claim 23 wherein the heated fluid comprises an exhaust gas from the engine.

25. A fuel injection system as set forth in claim 24 wherein the engine is a ported engine and the chamber is adjacent an exhaust port of the engine.

26. A fuel injection system for an internal combustion engine comprising means defining a chamber adapted to communicate with the engine through an injection port, means for delivering a pressurized gas to said chamber, a perforate number in said chamber and across and through which said pressurized gas must flow at least in part to exit said injection port, and a fuel injector for spraying fuel into said chamber and at least in part onto said perforate number.

27. A fuel injection system as set forth in claim 26 wherein the perforated number extends across the chamber and all gas flowing out of the injection port must pass through the perforated member.

28. A fuel injection system as set forth in claim 27 wherein the perforated member comprises a plate like member.

29. A fuel injection system as set forth in claim 28 further including means for heating the perforated member.

30. A fuel injection system as set forth in claim 28 wherein the fuel injector sprays at a direction generally parallel to the plane of the perforated member.

31. A fuel injection system as set forth in claim 30 further including means for heating the perforated member.

32. A fuel injection system as set forth in claim 27 wherein the perforated member comprises a perforated cylinder contained within the chamber.

33. A fuel injection system as set forth in claim 32 wherein the fuel injector sprays generally perpendicularly to the perforated cylinder.

34. A fuel injection system as set forth in claim 26 wherein the injection port communicates directly with the combustion chamber of the engine.

35. A fuel injection system as set forth in claim 34 wherein the injection port is selectively opened and closed.

36. A fuel injection system as set forth in claim 35 wherein the chamber is formed by a pair of relatively moveable components and the injection port is formed in one of the components as it is opened and closed by the other of the components.

37. A fuel injection system as set forth in claim 36 wherein the engine is a reciprocating engine and the components comprise a cylinder and a piston reciprocating in the cylinder.

38. A fuel injection system as set forth in claim 37 wherein the perforated member extends across the chamber and all gas flowing out of the injection port must pass through the perforated member.

39. A fuel injection system as set forth in claim 38 wherein the perforated member comprises a plate like member.

40. A fuel injection system as set forth in claim 39 further including means for heating the perforated member.

41. A fuel injection system as set forth in claim 39 wherein the fuel injector sprays at a direction generally parallel to the plane of the perforated member.

42. A fuel injection system as set forth in claim 41 further including means for heating the perforated member.

43. A fuel injection system as set forth in claim 38 wherein the perforated member comprises a perforated cylinder contained within the chamber.

44. A fuel injection system as set forth in claim 43 wherein the fuel injector sprays generally perpendicularly to the perforated cylinder.

45. A fuel injection system as set forth in claim 15 wherein the means for heating the chamber comprises a heater disposed in the chamber.

* * * * *